United States Patent
Rosenflanz et al.

(10) Patent No.: US 7,179,526 B2
(45) Date of Patent: Feb. 20, 2007

(54) PLASMA SPRAYING

(75) Inventors: Anatoly Z. Rosenflanz, Maplewood, MN (US); Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 496 days.

(21) Appl. No.: 10/211,640

(22) Filed: Aug. 2, 2002

(65) Prior Publication Data

US 2004/0023078 A1 Feb. 5, 2004

(51) Int. Cl.
*B32B 5/16* (2006.01)
*C03C 14/00* (2006.01)

(52) U.S. Cl. .................. 428/329; 428/32; 428/689; 428/697; 428/702; 501/32; 501/152

(58) Field of Classification Search ................ 428/329, 428/332, 689, 697, 702; 501/2, 5, 10, 32, 501/152, 153; 51/295, 307–309
See application file for complete search history.

(56) References Cited

U.S. PATENT DOCUMENTS

| 659,926 A | 10/1900 | Jacobs |
|---|---|---|
| 906,339 A | 12/1908 | Tone |
| 960,712 A | 6/1910 | Saunders |
| 1,037,999 A | 9/1912 | Saunders |
| 1,107,011 A | 8/1914 | Allen |
| 1,149,064 A | 8/1915 | Kalmus |
| 1,161,620 A | 11/1915 | Coulter |
| 1,192,709 A | 7/1916 | Tone |
| 1,240,490 A | 9/1917 | Saunders et al. |
| 1,247,337 A | 11/1917 | Saunders et al. |
| 1,257,356 A | 2/1918 | Hutchins |
| 1,263,708 A | 4/1918 | Saunders et al. |
| 1,263,709 A | 4/1918 | Saunders et al. |
| 1,263,710 A | 4/1918 | Saunders et al. |
| 1,268,532 A | 6/1918 | Allen |
| 1,268,533 A | 6/1918 | Allen |
| 1,314,061 A | 8/1919 | Harrison |
| 1,339,344 A | 5/1920 | Hutchins |
| 1,402,714 A | 1/1922 | Brockbank |
| 1,448,586 A | 3/1923 | Allen |
| 1,910,444 A | 5/1933 | Nicholson |
| 2,000,857 A | 5/1935 | Masin |
| 2,206,081 A | 7/1940 | Eberlin |
| 2,424,645 A | 7/1947 | Baumann, Jr. et al. |
| 2,618,567 A | 11/1952 | Comstock, III |
| 2,805,166 A | 9/1957 | Loffler |
| 2,958,593 A | 11/1960 | Hoover et al. |
| 2,961,296 A | 11/1960 | Fenerty |
| 3,041,156 A | 6/1962 | Rowse et al. |
| 3,141,747 A | 7/1964 | Marshall |
| 3,174,871 A | 3/1965 | Geffcken et al. |
| 3,181,939 A | 5/1965 | Marshall et al. |
| 3,216,794 A | 11/1965 | Roschuk |

(Continued)

FOREIGN PATENT DOCUMENTS

| AT | 333146 | * 10/1976 |
|---|---|---|
| DD | 134 638 A | 3/1979 |
| DE | 20 34 011 | 7/1970 |
| DE | 141 420 | * 4/1980 |

(Continued)

OTHER PUBLICATIONS

Kondrashov V I et al., "Opacified Glass "Decorit" Synthesis Directions", Steklo I Keramika 2001, No. 1, pp. 8–11.

(Continued)

*Primary Examiner*—G. Blackwell
*Assistant Examiner*—Jennifer C. McNeil

(57) ABSTRACT

Plasma spraying, apparatus for plasma spraying, and methods of plasma spraying.

46 Claims, 3 Drawing Sheets

U.S. PATENT DOCUMENTS

| | | |
|---|---|---|
| 3,377,660 A | 4/1968 | Marshall et al. |
| 3,498,769 A | 3/1970 | Coes, Jr. |
| 3,625,717 A | 12/1971 | Grubba et al. |
| 3,635,739 A | 1/1972 | Macdowell et al |
| 3,637,361 A | 1/1972 | Kita et al. |
| 3,646,713 A | 3/1972 | Marshall et al. |
| 3,650,780 A | 3/1972 | Connelly |
| 3,714,059 A | 1/1973 | Shaw et al. |
| 3,717,583 A | 2/1973 | Shaw et al. |
| 3,726,621 A | 4/1973 | Cichy |
| 3,754,978 A | 8/1973 | Elmer et al. |
| 3,781,172 A | 12/1973 | Pett et al. |
| 3,792,553 A | 2/1974 | Schleifer et al. |
| 3,859,407 A | 1/1975 | Blanding et al. |
| 3,881,282 A | 5/1975 | Watson |
| 3,891,408 A | 6/1975 | Rowse et al. |
| 3,893,826 A | 7/1975 | Quinan et al. |
| 3,916,584 A | 11/1975 | Howard et al. |
| 3,926,603 A | 12/1975 | Plesslinger et al. |
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,162,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papai et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Wood et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhof-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |

| | | |
|---|---|---|
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,645,619 A | 7/1997 | Erickson et al. |
| 5,651,925 A | 7/1997 | Ashley et al. |
| 5,653,775 A | 8/1997 | Plovnick et al. |
| 5,665,127 A | 9/1997 | Moltgen et al. |
| 5,679,067 A | 10/1997 | Johnson et al. |
| 5,682,082 A | 10/1997 | Wei et al. |
| 5,693,239 A | 12/1997 | Wang et al. |
| 5,721,188 A | 2/1998 | Sung et al. |
| 5,725,162 A | 3/1998 | Garg et al. |
| 5,733,178 A | 3/1998 | Ohishi |
| 5,733,564 A | 3/1998 | Lehtinen |
| 5,738,696 A | 4/1998 | Wu |
| 5,747,397 A | 5/1998 | McPherson et al. |
| 5,763,345 A | 6/1998 | Ohshima et al. |
| 5,782,940 A | 7/1998 | Jayan et al. |
| 5,804,513 A | 9/1998 | Sakatani et al. |
| 5,847,865 A | 12/1998 | Gopinath et al. |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,413 A | 11/1999 | Hale |
| 5,981,415 A | 11/1999 | Waku et al. |
| 6,053,956 A | 4/2000 | Wood |
| 6,054,093 A | 4/2000 | Torre, Jr. et al. |
| 6,123,743 A | 9/2000 | Carman et al. |
| 6,128,430 A | 10/2000 | Chu et al. |
| 6,146,244 A | 11/2000 | Atsugi et al. |
| 6,214,429 B1 | 4/2001 | Zou et al. |
| 6,245,700 B1 | 6/2001 | Budd et al. |
| 6,251,813 B1 | 6/2001 | Sato |
| 6,254,981 B1 | 7/2001 | Castle |
| 6,268,303 B1 | 7/2001 | Aitken et al. |
| 6,277,161 B1 | 8/2001 | Castro et al. |
| 6,287,353 B1 * | 9/2001 | Celikkaya ............... 51/309 |
| 6,306,926 B1 | 10/2001 | Bretscher et al. |
| 6,335,083 B1 | 1/2002 | Kasai et al. |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B2 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,490,081 B1 | 12/2002 | Feillens et al. |
| 6,511,739 B2 | 1/2003 | Kasai et al. |
| 6,514,892 B1 | 2/2003 | Kasai et al. |
| 6,521,004 B1 | 2/2003 | Culler et al. |
| 6,620,214 B2 | 9/2003 | McArdle et al. |
| 6,749,653 B2 * | 6/2004 | Castro et al. |
| 2002/0066233 A1 * | 6/2002 | McArdie et al. |
| 2002/0160694 A1 * | 10/2002 | Wood et al. |
| 2003/0040423 A1 | 2/2003 | Harada et al. |
| 2004/0148868 A1 | 8/2004 | Anderson et al. |
| 2005/0060948 A1 | 3/2005 | Rosenflanz |
| 2005/0075233 A1 | 4/2005 | Weber et al. |

FOREIGN PATENT DOCUMENTS

| | | |
|---|---|---|
| EP | 0 200 487 | 11/1986 |
| EP | 0 227 374 * | 7/1987 |
| EP | 0 236 507 * | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 * | 8/1995 |
| EP | 0 666 239 B1 * | 8/1995 |
| EP | 0 709 347 | 5/1996 |
| EP | 0 722 919 A1 | 7/1996 |
| EP | 0 291 029 B2 | 11/1996 |
| FR | 1547989 * | 10/1968 |
| FR | 2 118 026 * | 7/1972 |
| FR | 2 538 370 | 6/1984 |
| FR | 2 609 708 * | 7/1988 |
| GB | 793503 * | 4/1958 |
| GB | 1005338 * | 9/1965 |
| GB | 1 121 875 | 7/1968 |
| GB | 1 260 933 A | 1/1972 |
| GB | 2 116 992 * | 10/1983 |
| JP | 50-25608 | 3/1975 |
| JP | 59 22 7726 A | 12/1984 |
| JP | 60-221338 | 11/1985 |
| JP | 61099665 * | 5/1986 |
| JP | 62-003041 * | 1/1987 |
| JP | S 63-156024 | 6/1988 |
| JP | S 63-303821 | 12/1988 |
| JP | HEI 4-119941 | 4/1992 |
| JP | 05-085821 * | 4/1993 |
| JP | 05-226733 | 9/1993 |
| JP | 06 040765 A | 2/1994 |
| JP | 06-171974 * | 6/1994 |
| JP | 3113428 A | 5/1999 |
| JP | HEI 11-189926 | 7/1999 |
| JP | 200045128 A | 2/2000 |
| JP | 200045129 A | 2/2000 |
| JP | 201294480 | 10/2001 |
| KR | 9601009 B1 | 1/1996 |
| SU | 1455569 * | 10/1986 |
| SU | 1455569 | 10/1996 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |
| WO | WO 03/011776 A1 | 2/2003 |

OTHER PUBLICATIONS

"$Gd_3Al_5O_{12}$ Phase Obtained by Crystallization of Amorphous $Gd_2O_3$ $^5/_3$ $Al_2O_3$," Shishido et al., *Journal of the American Ceramic Society*, vol. 61, No. 7–8, Jul.–Aug. 1978, pp. 373–374.

"Rapid Quenching on the Binary Systems of High Temperature Oxides," Suzuki et al., *Mat. Res. Bull.*, vol. 9, 1974, pp. 745–754.

"Unusual Glass Formation in the Al–Nd–O System," Yajima et al., Chemistry Letters (published by the Chemical Society of Japan), 1973, pp. 741–742.

Glass Formation in the Ln–Al–O System, (Ln: Lanthanoid and Yttrium Elements), Yajima et al., Chemistry Letters, 1973, pp. 1327–1330.

"Production and Studies of Alumina Based Refractory Glass," Coutures et al., *Mat. Res. Bull.*, vol. 10, No. 6, 1975, pp 539–546.

"Net Optical Gain at 1.53 μm in Er–Doped $Al_2O_3$ Waveguides on Silicon," van den Hoven et al., Appl. Phys. Lett. 68 (14), Apr. 1, 1966, pp. 1886–1888.

"Durable 3—5 μm Transmitting Infrared Window Materials," Harris et al., Infrared Physics & Technology 39, 1998, pp. 185–201.

"Erbium–Doped Phosphate Glass Waveguide on Silicon with 4.1 dB/cm Gain at 1.535 μm," Yan et al., Appl. Phys. Lett, 71 (20), Nov. 17, 1997.

U.S. Appl. No. 10/358,772, filed Feb. 5, 2003, Methods of Making Ceramic Particles.

U.S. Appl. No. 10/358,765, filed Feb. 5, 2003, Methods of Making Ceramics.

U.S. Appl. No. 10/358,910, filed Feb. 5, 2003, Ceramics and Methods of Making the Same.

U.S. Appl. No. 10/358,855, filed Feb. 5, 2003, $Al_2O_3$–$La_2O_3$–MgO Ceramics, and Methods of Making the Same.

U.S. Appl. No. 10/358,708, filed Feb. 5, 2003, Methods of Making $Al_2O_3$–$SiO_2$ Ceramics.

Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US).

"Eutectic Precipitation of the Spinel Solid Solution–Yttrium Aluminum Garnet (YAG) System," Shuqiang Wang et al., *Journal of the American Ceramic Society*, 1998, vol. 81, No. 1, pp. 263–265.

"Microstructures of laser–treated $Al_2O_3$–$ZrO_2$–$CeO_2$ composites," Zan–Hwey Chen et al., *Materials Science & Engineering A (Structural Materials: Properties, Microstructure and Processing)*, 1995, vol. A196, No. 1–2, pp. 253–260.

"Advances in the Grinding Efficiency of Sintered Alumina Abrasives," Andreas Krell et al., *Journal of the American Ceramic Society*, 1996, vol. 79, No. 3, pp. 763–769.

"Interface modification for increased fracture toughness in reaction–formed yttrium aluminum garnet/alumina eutectic composites," Luke N. Brewer et al., 1999, vol. 14, No. 10, pp. 3907–3912.

Dow Jones Interactive Internet Printout on Jun. 20, 2001 for web address "http://ptg.djnr.com/ccroot/asp/publib/story.asp"; "China's Rare Earth Industry in the Dodlrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Trader's View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug., 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6–7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66–70, Abstract in English.

"Divorced Eutectic and Interface Characteristics in a Solidified YAG–Spinel Composite With Spinel–Rich Composition", S. Wang et al., J. Mat. Sci., 35, 2000, pp. 2757–2761.

"Processing, Microstructure, and Strength of Alumina–YAG Eutectic Polycrystals", Tai–il Mah et al., J. Am. Ceram. Soc., 83, [8], 2000, pp. 2088–2090.

"Phase Identification of $Al_2O_3$/$RE_3Al_5O_{12}$ and $Al_2O_3$/$REAlO_3$ (RE=SM–Lu, Y) Eutectics", J. Crystal Growth, 218, 2000, pp. 67–73.

"Crystallization and Thermal Properties of $Al_2O_3$–$Y_2O_3$ Melts", S. V. Stankus et al., J. Crystal Growth, 167, 1996, pp. 165–170.

Dialog © file 319: Chem Bus NewsBase © 2001 Royal Soc Chemistry. Abstract for "China: Oversupply Puts Rare Earths Projects On Hold", Industrial Minerals n 359, p. 10.

"Rare–Earth Metals", J. Hedrick, pp. 61.1–61.6, 1997.

"Rare–Earth Metals Prices in the USA ca. 1960 to 1994", J. Hedrick, J. Alloys and Compounds, 1997, pp. 471–481.

"Preliminary data on subsolidus phase equilibria in the $La_2O_3$–$Al_2O_3$–$Mn_2O_3$ and $La_2O_3$–$Al_2O_3$–$Fe_2O_3$ systems", Hrovat et al., *Journal of Materials Science Letters*, vol. 14, 1995, pp. 265–267.

"Aspects of Synthesis of Decorite Opacified Glass", Keramika, *Glass and Ceramics*, vol. 58, Nos. 1–2, pp. 8–11, Jan., 2001.

"A New Ceramic Eutectic Composite with High Strength at 1873 K", Yoshiharu Waku, *Advanced Materials*, vol. 10, No. 8, 1998, pp. 615–617.

"Synthesis of Y–Al Garnet", Krokhin et al., *Glass and Ceramics*, vol. 55, Nos. 5–6, 1998, pp. 151–152.

"High–temperature strength and thermal stability of a uni-directionally solidified $Al_2O_3$/YAG eutectic composite", Waku et al., pp. 1217–1225.

"Sapphire matrix composites reinforced with single crystal VAG phases", Waku et al., *Journal of Materials Science*, vol. 31, 1996, pp. 4663–4670.

"Thermo–Mechanical Stability Of Directionally Solidified $Al_2O_3$–$ZrO_2(Y_2O_3)$ Eutectic Fibers", Yang and Zhu, *Scripta Materialia*, vol. 36, No. 8, 1997, pp. 961–965.

"A ductile ceramic eutectic composite with high strength at 1,873 K", Waku et al., *Nature*, vol. 389, Sep. 1997, pp. 49–52.

"The Liquidus Surface In The $Al_2O_3$–$ZrO_2$–$Y_2O_3$ Phase Diagram", Lakiza et al., *Powder Metallurgy and Metal Ceramics*, vol. 33, No. 11–12, 1994, pp. 595–597.

"Powder–Material Research Methods And Properties Polythermal Sections Of The $Al_2O_3$–$ZrO_2$–$Y_2O_3$ Phase Diagram", Lakiza et al., *Powder Metallurgy and Metal Ceramics*, vol. 34, No. 11–12, 1995, pp. 655–659.

"Metastable Phase Relationships In The System $Al_2O_3$–$ZrO_2$–$Y_2O_3$", Lakiz and Lopato, *Powder Metallurgy and Metal Ceramics*, vol. 35, Nos. 11–12, 1996, pp. 621–626.

"Solidus Surface And Phase Equilibria During The Solidification Of Alloys In The $Al_2O_3$–$ZrO_2$–$Y_2O_3$ System", Lakiza et al., *Powder Metallurgy and Metal Ceramics*, vol. 34, Nos. 1–2, 1995, pp. 64–67.

"Methods Of Investigation Of Properties Of Powder Materials, Interactions In The $Al_2O_3$–$ZrO_2$–$Y_2O_3$ System", Lakiza et al., *Powder Metallurgy and Metal Ceramics*, vol. 33, Nos. 9–10, 1994, pp. 486–490.

"Rapid Solidification of Ceramics a Technology Assessment", Brockway et al. *Metals and Ceramics Information Center*, MCIC Report, Jan. 1984 MCIC 84–49.

Figs, 311, 346, 350, 354–56, 373, and 716, *Phase Diagrams For Ceramists*, The American Ceramic Society, 1964, pp. 122, 136, 138, 140, 144, 248.

Figs. 2340–44, 2363, 2370, 2374–75, 2382–83, 2385, 2387, 2390, and 2392, *Phase Diagrams For Ceramists, 1969 Supplement*, The American Ceramic Society, 1969, pp. 95–96, 100, 102–103, 105–108.

Figs. 4366–71, 4377–78, 4404–05, 4417, 4426, 4430, 4433, 4437, 4440, 4444, 4457, 4572, and 4602, *Phase Diagrams For Ceramists, 1975 Supplement*, The American Ceramic Society, 1975, pp. 130–132, 135–136, 147, 152, 157, 159–160, 163–164, 166, 172–173, 238, 257.

Figs. 5042, 5211, 5217, 5224, 5228, 5232, 5237, 5239, 5241, 5245, 5251, 5257, 5418, and 5437, *Phase Diagrams For Ceramists, vol. IV*, The American Ceramic Society, 1981, pp. 29, 125, 127, 129–131, 133, 135–137, 139, 141, 143, 220, 228.

Fig. 6464, *Phase Diagrams For Ceramists, vol. VI*, The American Ceramic Society, 1981, p. 162.

Figs, 9262, and 9264, *Phase Diagrams For Ceramists, Vol. XI, Oxides*, The American Ceramic Society, 1995, pp. 105–106.

"Phase Equilibria in the Yttrium Oxide–Alumina System", Toropov et al., *Bulletin of the Academy of Sciences, USSR*, Division of Chemical Science, No. 7, Jul., 1964, pp. 1076–1081, A translation of *Seriya Khimicheskaya*.

McKittrick, Joanna, et al., "Non–stoichiometry and defect structures in rapidly solidified $MgO$–$Al_2O_3$–$ZrO_2$ ternary eutectics," *Materials Science and Engineering* A231 (1997) 90–97.

Weber, J.K. Richard et al., "Glass fibres of pure and erbium– or neodymium–doped yttria–alumina compositions", Nature, Jun. 25, 1998, vol. 393, pp. 769–771.

Waku, Yoshiharu, et al., "A jelly–like ceramic fiber at 1193 K", Mat Res Innovat, 2000, vol. 3, pp. 185–189.

Weber, J.K. Richard et al., "Glass Formation and Polyamorphism in Rare–Earth Oxide–Aluminum Oxide Compositions", J. American Ceramic Society, 83 [8], 2000, 1868–1872.

Aguilar, E.A., "Processing and crystallization of rapidly solidified $Al_2O_3$–$Y_2O_3$ fibres", British Ceramic Transactions, 2000, vol. 99, No. 6, pp. 256–259.

U.S. Patent Application entitled "Fused $Al_2O_3Y_2O_3$ Eutectic Abrasive Particles, Abrasive Articles, And Methods Of Making And Using The Same", filed Jul. 19, 2000, Rosenflanz et al. having U.S. Appl. No. 09/620,262.

U.S. Patent Application entitled "Fused–$Al_2O_3$–$MgO$–$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618,879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/Nitride—$Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/Nitride–$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$–$Y_2O_3$–$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$–Rare Earth Oxide–$ZrO_2$ Eutectic Materials", filed Jul. 19, 2000, Rosenflanz having U.S Appl. No. 09/619,192.

U.S. Patent Application entitled "Fused $Al_2O_3$–Rare Earth Oxide–$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$–Rare Earth Oxide–$ZrO_2$/$HfO_2$ Materials, and Methods of Making and Using the Same", filed Aug. 2, 2002, Rosenflanz having U.S. Appl. No. 10/211,597.

U.S. Patent Application entitled "$Al_2O_3$–$Y_2O_3$–$ZrO_2$/$HfO_2$ Materials, and Methods of Making and Using the Same", filed Aug. 2, 2002, Rosenflanz having U.S. Appl. No. 10/211,638.

U.S. Patent Application entitled, "Abrasive Particles, and Methods of Making and Using the Same", filed Aug. 2, 2002, Rosenflanz having U.S. Appl. No. 10/211,629.

U.S. Patent Application entitled, "Abrasive Particles, Abrasive Articles, and Methods of Making and Using the Same", filed Aug. 2, 2002, Rosenflanz et al. having U.S. Appl. No. 10/211,598.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled, "Glass–Ceramics", filed Aug. 2, 2002, Rosenflanz having U.S. Appl. No. 10/211,044.

U.S. Patent Application entitled, "Alunmina–Zirconia, and Methods of Making and Using the Same", filed Aug. 2, 2002, Rosenflanz et al. having U.S. Appl. No. 10/211,620.

U.S. Patent Application entitled, "Method of Making Ceramic Articles", filed Aug. 2, 2002, Rosenflanz having U.S. Appl. No. 10/211,481.

U.S. Patent Application entitled "Method of Making Amorphous and Ceramics via Melt Spinning," filed Aug. 2, 2002, Rosenflanz et al. having U.S. Appl. No. 10/211,684.

Gandi, A.S. and Jarayam, V., "Pressure Consolidation of Amorphous $ZrO_2$–$Al_2O_3$ by Plastic Deformation of Powder Particles", Acta Materiala, 50 (2002), 2137–2149.

Gonzalez, Eduardo J., et al., "High Pressure Compaction and Sintering of Nano–Size $\gamma$–$Al_2O_3$ Powder", *Materials and Manufacturing Processes* vol. 11, No. 6, 951–967, 1996.

Imakoa, Minoru et al., "Refractive Index and Abbe's Number of Glass of Lanthanum Borate System", Journal Ceramic Assoc. Japan, vol. 70, No. 5, (1962), pp. 115.

Jantzen, C.M., Krepski, R.P., & Herman, H., "Ultra–Rapid Quenching of Laser–Method Binary and Unary Oxides", *Mat. Res. Bull.* 15, 1313–1326 (1980).

Khor K.A., "Novel ZrO2–Mullite Composites Produced By Plasma Spraying", Proceedings of the 15$^{th}$ International Thermal Pray Conference, May 25–29 1998, Nice, France.

Kingery, W.D., INTRODUCTION TO CERAMICS, Second Edition, Chpt. III subchapter 8.8, Glass–Ceramic Materials, pp. 368–374, (1976).

Kokubo, Tadashi et al., "Infrared Tranmission of ($R_2$or R'O)–($TiO_2$, $Nb_2O_5$ or $Ta_2O_5$)–$Al_2O_3$ Glasses", Journal of Non–Crystalline Solids 22 (1970) 125–134.

McMillan, P.W., *Glass–Ceramics,* Academic Press, Inc., 2$^{nd}$ Edition (1979)★★.

Ray, C.S. and Day, D.E., "Determining the Nucleation Rate Curve for Lithium Disillicate Glass by Differential Thermal Analysis", J. Am. Cerm. Soc. 73(2) 439–442 (1990).

Schmucker, M, et al., "Constitution of Mullite Glasses Produced by Ultra–Rapid Quenching of Plasama–Sprayed Melts", Journal of the European Ceramic Society 15 (1995) 1201–1205.

Sarjeant, P.T, & Roy, R., in *Reactivity of Solids* (ed. J. W. Mitchell, R.C., DeVries, R.W., Roberts and P. Cannon) 725–33 (John Wiley & Sons, Inc., New York 1969).

Stookey. S.D., Ceramic Made by Nucleation of Glass–Comparsion of Microstructure and Properties with Sintered Ceramics, The Amercian Ceramic Society, (1992), pp. 1–4.

Takamori, T., & Roy, R., "Rapid Crystallization of $SiO_2$–$Al_2O_3$ Glasses", Journal of American Society, vol. 56, No. 12, Dec. 1973.

Varshneya, Arun K., "Fundamentsal of Inorganic Glasses", pp. 425–427 (1994).

Weber et al., "Synthesis and Optical Properties of Rare–Earth–Aluminum Oxide Glasses", J. Am. Ceram. Soc. 85(5) 1309–1311 (2002).

Wilding, M.C., McMillan, P.F., "Polyamorphic Transitions in Yttria–Alumina Liquids", *J. Non–Crst. Solids.* 293–295, 357–365 (2001).

"RARE EARTH OXIDE–ALUMINUM OXIDE GLASSES FOR MID–RANGE IR DEVICES," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

DEVICE MATERIALS BASED ON Er–, Ho–, Tm, and Yb–DOPED RARE EARTH ALUMINUM OXIDE (REAI™) GLASS, Weber et al., reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).

U.S. Application entitled "Agglomerate Abrasive Grain and a Method of Making the Same", filed Feb. 11, 2004, having U.S. Appl. No. 10/776156 (Attorney Docket No. 55304US016) now USPN 6881483.

U.S. Application entitled "Methods of Making Ceramic Particles", filed Sep. 5, 2003, having U.S. Appl. No. 10/655729 PUB 2005 0056055.

U.S. Application entitled "Methods of Making Ceramics Comprising $Al_2O_3$, REO, $ZrO_2$ and/or $HfO_2$, and $Nb_2O_5$ and/or $Ta_2O_5$,", filed Sep. 18, 2003, having U.S. Appl. No. 10/666615 USPUB 2005 0060948.

U.S. Application entitled "Ceramics Comprising $Al_2O_3$, REO, $ZrO_2$ and/or $HfO_2$, and $Nb_2O_5$ and/or $Ta_2O_5$, and Methods of Making The Same", filed Sep. 18, 2003, having U.S. Appl. No. 10/666212 USPGPUB 2005 0065013.

U.S. Application entitled "Ceramics Comprising $Al_2O_3$, $ZrO_2$ and/or $HfO_2$, $Nb_2O_2$, and/or $Ta_2O_5$, and Methods of Making The Same", filed Sep. 18, 2003, having U.S. Appl. No. 10/666,098 USPGPUB 2005 0065012.

U.S. Application entitled "Use of Ceramics In Dental And Orthodontic Applications", filed Feb. 5, 2003, having U.S. Appl. 10/358,856 PGPUB 2004 0152034.

U.S. Application entitled "Use of Glasses Containing Rare Earth Oxide, Alumina, and Zirconia And Dopant In Optical Waveguides", filed Apr. 28, 2003, having U.S. Appl. No. 10/425,039 USPGPUB 2004 0213539.

* cited by examiner

US 7,179,526 B2

PLASMA SPRAYING

FIELD OF THE INVENTION

This invention relates to plasma spraying.

DESCRIPTION OF RELATED ART

Plasma spraying to provide amorphous, ceramic, metal, metallic alloy, and intermetallic materials is well known in the art. While plasma spraying is commonly used for surface modification and/or to provide coatings, it has also been used to form bulk materials.

Plasma spraying is typically conducted by introducing feed particles into a plasma (typically at temperatures over 10,000° C.), to convert the feed particles into a melt (molten droplets), which are then brought in contact with a substrate to cool them (typically at cooling rates over 10,000° C./sec). Upon contact with the substrate, the molten droplets rapidly solidify resulting in an amorphous, partially crystalline, or crystalline material.

Plasma spray processing has been used to form a variety of materials including, metals, metallic alloys, intermetallics, and ceramics. Depending, for example, on the length of the operation, the operating conditions, the substrate, and feed material, a variety of structures varying from thin, thick, multi-layered and composite films to bulk materials may be deposited. Furthermore, the nature of the deposited materials, such as the composition, density, the structure can be varied continuously or in a stepwise manner.

Plasma-sprayed coatings and bulk materials are employed in a wide array of applications ranging from microelectronic components to large engineered structures. For example, the plasma sprayed coatings find applications as protective (abrasion-, oxidation-, and corrosion-resistant, thermal-barrier) coatings. Similarly, use of plasma processing for making bulk materials is increasing.

Among the wide variety of plasma processed materials, oxide ceramics hold a special place due to their desirable properties including their insulating abilities and abrasive, corrosive, and thermal-shock resistance. The most commonly plasma-spray processed oxide ceramics have been alumina, alumina-titania, stabilized zirconia, and chromia.

The very high quench rates typically associated with plasma-spray processing facilitate formation of non-equilibrium, metastable or non-stoichiometric phases. For example, plasma-sprayed alumina, and alumina-titania typically form metastable transitional alumina. Similarly, plasma-sprayed fully-or partially-stabilized zirconia typically form non-equilibrium tetragonal phase.

In another aspect, the relatively high quench rates associated with plasma-spraying can lead to the formation of ceramics with extremely fine (such as nanocrystalline) crystals within each splat (i.e., within each solidified droplet) making up the plasma-sprayed ceramic. In general, it is known in the art that ceramics with fine crystalline structures, particularly in combination with high density (i.e., at least 70% of theoretical, preferably at least 90, 95, 96, 97, 98, 99, or even 100%) have more desirable properties as compared to coarser and/or less dense materials.

There is a continuing desire for new materials to use for plasma spraying, as well as new plasma sprayed materials.

SUMMARY OF THE INVENTION

In one aspect, the present invention provides a method for making amorphous material, the method comprising:

feeding particles into a plasma to provide a melt, the particles comprising at least 35 (in some embodiments, preferably at least 40, 45, 50, 55, 60, 65, or even at least 70) percent by weight $Al_2O_3$, based on the total weight of the particles, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles, with the proviso that if the metal oxide other than $Al_2O_3$ is $ZrO_2$, then the particles further comprises a metal oxide other than $Al_2O_3$ and $ZrO_2$; and spraying and cooling the melt to provide amorphous material, the amorphous material comprising at least 35 (in some embodiments, preferably at least 35 40, 45, 50, 55,60, 65, or even at least 70) percent by weight $Al_2O_3$, based on the total weight of the amorphous material, and the metal oxide other than $Al_2O_3$, and complex metal oxides thereof), wherein the amorphous material contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the amorphous material, wherein the amorphous material has x, y, and z dimensions each perpendicular to each other, and wherein each of the x, y, and z dimensions is at least 1, 5, 10, 25 micrometers (in some embodiments, preferably, at least al least 30 micrometers, 35 micrometers, 40 micrometers, 45 micrometers, 50 micrometers, 75 micrometers. 100 micrometers, 150 micrometers, 200 micrometers, 250 micrometers, 500 micrometers, 1000 micrometers, 2000 micrometers, 2500 micrometers, 1 mm, 5 mm, or even at least 10 mm), with the proviso that if the metal oxide other than $Al_2O_3$, is $ZrO_2$, then the particles further comprises a metal oxide other than $Al_2O_3$, and $ZrO_2$ that forms at least one distinct crystalline phase when the amorphous material is crystallized. The x, y, and z dimensions of a material are determined either visually or using microscopy, depending on the magnitude of the dimensions. The reported z dimension is, for example, the diameter of a sphere, the thickness of a coating, or the longest length of prismatic shape.

In another aspect, the present invention provides a method for making glass, the method comprising:

feeding particles into a plasma to provide a melt, the particles comprising at least 35 (in some embodiments, preferably at least 40, 45, 50, 55, 60, 65, or even at least 70) percent by weight $Al_2O_3$, based on the total weight of the particles, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles; and spraying and cooling the melt to provide glass, the glass comprising at least 35 (in some embodiments, preferably at least 35 40, 45, 50, 55, 60, 65, or even at least 70) percent by weight $Al_2O_3$, based on the total weight of the glass, and the metal oxide other than $Al_2O_3$, and complex metal oxides thereof), wherein the glass contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, TeO$_2$, and V$_2$O$_5$, based on the total weight of the glass. In some embodiments, the glass has x, y, and z dimensions each perpendicular to each other, and wherein each of the x, y, and z dimensions is at least 1, 5, 10, 25 micrometers (in some embodiments, preferably, at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm).

In one aspect, the present invention provides a method for making amorphous material, the method comprising:

feeding particles into a plasma to provide a melt, the particles comprising at least 35 (in some embodiments, preferably at least 40, 45, 50, 55, 60, 65, or even at least 70) percent by weight Al$_2$O$_3$, based on the total weight of the particles, a first metal oxide other than Al$_2$O$_3$ (e.g., Y$_2$O$_3$, REO, ZrO$_2$, TiO$_2$, CaO, Cr$_2$O$_3$, MgO, NiO, CuO, and complex metal oxides thereof), and a second, different metal oxide other than Al$_2$O$_3$ (e.g., Y$_2$O$_3$, REO, ZrO$_2$, TiO$_2$, CaO, Cr$_2$O$_3$, MgO, NiO, CuO, and complex metal oxides thereof), wherein the Al$_2$O$_3$, first metal oxide, and second metal oxide collectively comprise at least 80 (in some embodiments, preferably, at least 85, 90, 95, 97, 98, 99, or even 100) percent by weight of the particles, and wherein the particles contain not more than 10 (in some embodiments, preferably not more than 5, 4, 3, 2, 1, or zero) percent by weight collectively As$_2$O$_3$, B$_2$O$_3$, GeO$_2$, P$_2$O$_5$, SiO$_2$, TeO$_2$, and V$_2$O$_5$, based on the total weight of the particles, with the proviso that if the first or second metal oxide other is ZrO$_2$, then the particles further comprises a metal oxide other than Al$_2$O$_3$ and ZrO$_2$ that at least a portion of which forms a distinct crystalline phase when the amorphous material is crystallized; and spraying and cooling the melt to provide the amorphous material, the amorphous material comprising at least 35 (in some embodiments, preferably at least 40, 45, 50, 55, 60, 65, or even at least 70) percent by weight Al$_2$O$_3$, based on the total weight of the amorphous material, the first metal oxide other than Al$_2$O$_3$, and complex metal oxides thereof), and the second, different metal oxide other than Al$_2$O$_3$, and complex metal oxides thereof), wherein the Al$_2$O$_3$, first metal oxide, and second metal oxide collectively comprise at least 80 (in some embodiments, preferably, at least 85, 90, 95, 97, 98, 99, or even 100) percent by weight of the amorphous material, wherein the amorphous material contains not more than 10 (in some embodiments, preferably not more than 5, 4, 3, 2, 1, or zero) percent by weight collectively As$_2$O$_3$, B$_2$O$_3$, GeO$_2$, P$_2$O$_5$, SiO$_2$, TeO$_2$, and V$_2$O$_5$, based on the total weight of the amorphous material, with the proviso that if the first or second metal oxide is ZrO$_2$, then the amorphous material further comprises a metal oxide other than Al$_2$O$_3$ and ZrO$_2$ at least a portion of which forms at least one distinct crystalline phase when the amorphous material is crystallized, wherein the amorphous material has x, y, and z dimensions each perpendicular to each other, and wherein each of the x, y, and z dimensions is at least 1, 5, 10, 25 micrometers (in some embodiments, preferably, at least at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm).

In another aspect, the present invention provides an apparatus for generating a thermal spray of metal oxide droplets, comprising:

a plasma arc spray gun operable to generate a plasma gas jet in a delivery direction, the plasma gas jet being substantially symmetrical about a jet axis; and a first carrier conduit operable to deliver metal oxide particles to the plasma gas jet, the first carrier conduit comprising a conduit axis that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the first conduit extend away from the jet axis in the delivery direction.

Optionally, the apparatus further comprises a second (third, or more) carrier conduit operable to deliver metal oxide particles to the plasma gas jet, the second (third, or more) carrier conduit may comprise a conduit axis that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the second conduit extend away from the jet axis in the delivery direction. Although not wanting to be bound by theory, it is believed that the use of specified angle desirably changes (e.g., increases) the residence time or the interaction of the feed particles in the plasma, wherein residence time increases, for example as the angle decreases.

In another aspect, the present invention provides an apparatus for generating a thermal spray of metal oxide droplets, comprising:

a plasma arc spray gun operable to generate a plasma gas jet in a delivery direction, the plasma gas jet being substantially symmetrical about a jet axis; and a first carrier conduit operable to deliver metal oxide particles to the plasma gas jet, the first carrier conduit comprising a particle delivery vector that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the particle delivery vector comprises a vector component having a direction that is substantially opposite the delivery direction.

Optionally, the apparatus further comprises a second (third or more) carrier conduit for delivering particles into the plasma gas jet, the second (third or more) carrier conduit may comprise a particle delivery vector that intersects the jet axis at an angle of not greater than 75 (in some embodiments, preferably not greater than 70, 65, 60, 55, 50, 45, 40, 35, 30, 25, 20, 15, 10, or even not greater than 5; in a range from 75 to 60, not greater than 70 to 60, or not greater than 65 to 60) degrees, wherein the particle delivery vector of the second (third or more) carrier conduit comprises a vector component having a direction that is substantially opposite the delivery direction, and is different than the vector component of the first carrier conduit. Although not wanting to be bound by theory, it is believed that the use of specified angle desirably changes (e.g., increases) the residence time or the interaction of the feed particles in the plasma, wherein residence time increases, for example as the angle decreases.

In another aspect, the present invention provides a method for making amorphous material, the method comprising:

generating a plasma gas jet in a delivery direction, the plasma gas jet being substantially symmetrical about a jet axis;

delivering particles into the plasma gas jet through a first carrier conduit to provide a melt, the first carrier conduit comprising a conduit axis that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the first conduit extends away from the jet axis in the delivery direction; and spraying and cooling the melt to provide amorphous material.

Optionally, method further comprises a second (third or more) carrier conduit for delivering particles into the plasma gas jet, the second (third or more) carrier conduit may comprise a conduit axis that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the second (third or more) conduit extends away from the jet axis in the delivery direction. Although not wanting to be bound by theory, it is believed that the use of specified angle desirably changes (e.g., increases) the residence time or the interaction of the feed particles in the plasma, wherein residence time increases, for example as the angle decreases.

In another aspect, the present invention provides a method for making amorphous material, the method comprising:

generating a plasma gas jet in a delivery direction, the plasma gas jet being substantially symmetrical about a jet axis;

delivering particles into the plasma gas jet through at least a first carrier conduit to provide a melt, the first carrier conduit comprising a particle delivery vector that intersects the jet axis at an angle of not greater than 75 degrees, and further wherein the particle delivery vector comprises a vector component having a direction that is substantially opposite the delivery direction; and spraying and cooling the melt to provide amorphous material.

Optionally, the method further comprises a second (third or more) carrier conduit for delivering particles into the plasma gas jet, the second (third or more) carrier conduit may comprise a particle delivery vector that intersects the jet axis at an angle of not greater than 75 (in some embodiments, preferably, not greater than 70, 65, 60, 55, 50, 45, 40, 35, 30, 25, 20, 15, 10, or even not greater than 5; in a range from 75 to 60, 70 to 60, or 65 to 60) degrees, wherein the particle delivery vector of the second (third or more) carrier conduit comprises a vector component having a direction that is substantially opposite the delivery direction, and is different than the vector component of the first carrier conduit. Although not wanting to be bound by theory, it is believed that the use of specified angle desirably changes (e.g., increases) the residence time or the interaction of the feed particles in the plasma, wherein residence time increases, for example as the angle decreases.

In another aspect, the present invention provides a method for making amorphous material, the method comprising:

generating a plasma gas jet in a delivery direction, the plasma gas jet being substantially symmetrical about a jet axis that extends along the delivery direction;

delivering particles entrained in a carrier gas into the plasma gas jet to provide a melt, the carrier gas comprising at least 50 (in some embodiments, preferably at least 55, 60, 65, 70, 75, 80, 85, 90, 95, or even at least 100) percent by volume nitrogen, based on the total weight of the carrier gas, and the particles comprising at least 35 (in some embodiments, preferably at least 40, 45, 50, 55, 60, 65, or even at least 70) percent by weight $Al_2O_3$, based on the total weight of the particles, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles, with the proviso that if the metal oxide other than $Al_2O_3$ is $ZrO_2$, then the particles further comprises a metal oxide other than $Al_2O_3$ and $ZrO_2$; and spraying and cooling the melt to provide amorphous material, the amorphous material comprising at least 35 (in some embodiments, preferably at least 40, 45, 50, 55, 60, 65, or even at least 70) percent by weight $Al_2O_3$, based on the total weight of the amorphous material, and the metal oxide other than $Al_2O_3$, wherein the amorphous material contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the amorphous material, wherein the amorphous material has x, y, and z dimensions each perpendicular to each other, and wherein each of the x, y, and z dimensions is at least 1, 5, 10, 25 micrometers (in some embodiments, preferably, at least at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm), with the proviso that if the metal oxide other than $Al_2O_3$ is $ZrO_2$, then the particles further comprises a metal oxide other than $Al_2O_3$ and $ZrO_2$ that forms at least one distinct crystalline phase when the amorphous material is crystallized.

Surprisingly, it was found that when nitrogen is used to deliver the particles, the size of the plasma jet increases significantly. The larger plasma jet size is beneficial, for example, because it tends to lead to increased residence time of the feed particles in the plasma jet, and thus enhanced, often desirable heat transfer to the particle, which in turn tends to lead to more complete and homogeneous melt formation, and a denser and stronger plasma sprayed material.

In another aspect, the present invention provides a method for making glass, the method comprising:

generating a plasma gas jet in a delivery direction, the plasma gas jet being substantially symmetrical about a jet axis that extends along the delivery direction;

delivering particles entrained in a carrier gas into the plasma gas jet to provide a melt, the carrier gas comprising at least 50 (in some embodiments, preferably at least 55, 60, 65, 70, 75, 80, 85, 90, 95, or even at least 100) percent by volume nitrogen, based on the total weight of the carrier gas, and the particles comprising at least 35 (in some embodiments, preferably at least 40, 45, 50, 55, 60, 65, or even at least 70) percent by weight $Al_2O_3$, based on the total weight of the particles, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles; and spraying and cooling the melt to provide glass, the glass comprising at least 35 (in some embodiments, preferably at least 40, 45, 50, 55, 60, 65, or even at least 70) percent by weight $Al_2O_3$, based on the total weight of the glass, and the metal oxide other than $Al_2O_3$, wherein the glass contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass. In some embodiments, the glass has x, y, and z dimensions each perpendicular to each other, and wherein each of the x, y, and z dimensions is at least 1, 5, 10, 25 micrometers (in some embodiments, preferably, at least at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm. Surprisingly, it was found that when nitrogen is used to deliver the particles, the size of the plasma jet increases significantly. The larger plasma jet size is beneficial, for example, because it tends to load to increased residence time of the feed particles in the plasma jet, and thus enhanced, often desirable heat transfer to the particles, which in turn tends to lead to more complete and homogeneous melt formation, and a denser and stronger plasma sprayed material.

In another aspect, the present invention provides a method for making amorphous material, the method comprising:

generating a plasma gas jet in a delivery direction, the plasma gas jet being substantially symmetrical about a jet axis that extends along the delivery direction;

delivering particles entrained in a carrier gas into the plasma gas jet to provide a melt, the carrier gas comprising at least 50 (in some embodiments, preferably at least 55, 60, 65, 70, 75, 80, 85, 90, 95, or even at least 100) percent by volume nitrogen, based on the total weight of the carrier gas, and the particles comprising at least 35 (in some embodiments, preferably at least 40, 45, 50, 55, 60, 65, or even at least 70) percent by weight $Al_2O_3$, based on the total weight of the particles, a first metal oxide other than $Al_2O_3$, and a second, different metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the $Al_2O_3$, first metal oxide, and second metal oxide collectively comprise at least 80 (in some embodiments, preferably, at least 85, 90, 95, 97, 98, 99, or even 100) percent by weight of the particles, and wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles, with the proviso that if the first or second metal oxide other is $ZrO_2$, then the particles further comprises a metal oxide other than $Al_2O_3$ and $ZrO_2$ that at least a portion of which forms a distinct crystalline phase when the amorphous material is crystallized; and spraying and cooling the melt to provide amorphous material, the amorphous material comprising at least 35 (in some embodiments, preferably at least 40, 45, 50, 55, 60, 65, or even at least 70) percent by weight $Al_2O_3$, based on the total weight of the amorphous material, the first metal oxide other than $Al_2O_3$, and the second, different metal oxide other than $Al_2O_3$, wherein the $Al_2O_3$, first metal oxide, and second metal oxide collectively comprise at least 80 (in some embodiments, preferably, at least 85, 90, 95, 97, 98, 99, or even 100) percent by weight of the amorphous material, wherein the amorphous material contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the amorphous material, with the proviso that if the first or second metal oxide is $ZrO_2$, then the amorphous material further comprises a metal oxide other than $Al_2O_3$ and $ZrO_2$ at least a portion of which forms at least one distinct crystalline phase when the amorphous material is crystallize. Surprisingly, it was found that when nitrogen is used to deliver the particles, the size of the plasma jet increases significantly. The larger plasma jet size is beneficial, for example, because it tends to increased residence time of the feed particles in the plasma jet, and thus enhanced, often desirable heat transfer to the particles, which in turn tends to lead to more complete and homogeneous melt formation, and a denser and stronger plasma sprayed material.

Optionally, the amorphous material made according to methods of the present invention may be present as part of ceramic material (i.e. the method may make ceramic comprising the amorphous material. In another aspect, in some embodiments, the spraying and cooling of the melt of methods according to the present invention includes spraying the melt onto a substrate and cooling to provide the amorphous material). In another aspect, in some embodiments, the spraying and cooling of the melt of methods according to the present invention includes spraying the melt into a liquid to cool the melt and provide particles comprising the amorphous material. The latter may provides beads comprising the amorphous material (including 100 percent amorphous beads).

Methods according to the present invention optionally further comprise heating the amorphous material such that that at least a portion of the amorphous material is converted to a glass-ceramic.

In this application:

"amorphous material" refers to material derived from a melt or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes amorphous material, glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$.metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3.Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3 \cdot REO$" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramics comprising crystals formed by heat-treating amorphous material;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3 \cdot$metal oxide, etc.) is crystalline, for example, in a glass-ceramic, it may be amorphous, crystalline, or portions amorphous and portions crystalline. For example if a glass-ceramic comprises $Al_2O_3$ and $ZrO_2$, the $Al_2O_3$ and $ZrO_2$ may each be in an amorphous state, crystalline state, or portions in an amorphous state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3 \cdot$metal oxides.

Further, it is understood that glass-ceramics formed by heating amorphous material not exhibiting a $T_g$ may not actually comprise glass, but rather may comprise the crystals and amorphous material that does not exhibiting a $T_g$.

Embodiments of coatings prepared according to the present invention may be useful, for example, as abrasion-, corrosion-, oxidation-resistant, and/or thermal-barrier coatings. Some embodiments of coatings prepared according to the present invention may be useful as components in electrochemical devices (e.g. fuel cell electrolytes with higher ionic conductivity compared to conventional YSZ (yttria stabilized zirconia) and/or electrodes). Bulk forms prepared according to the present invention may be useful, for example, for structural applications (e.g., engine components, cutting tool inserts, medical implants, surgical instruments, substrates, and crucibles), and reinforcing members. Examples of articles according of the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate. Embodiments may also be useful, for example, as abrasive particles. The abrasive particles may be incorporated into abrasive articles or utilized in loose form, such as in slurries of abrading compounds (e.g., polishing compounds), milling media, shot blast media, and vibratory mill media.

DETAILED DESCRIPTION

Figure 4:
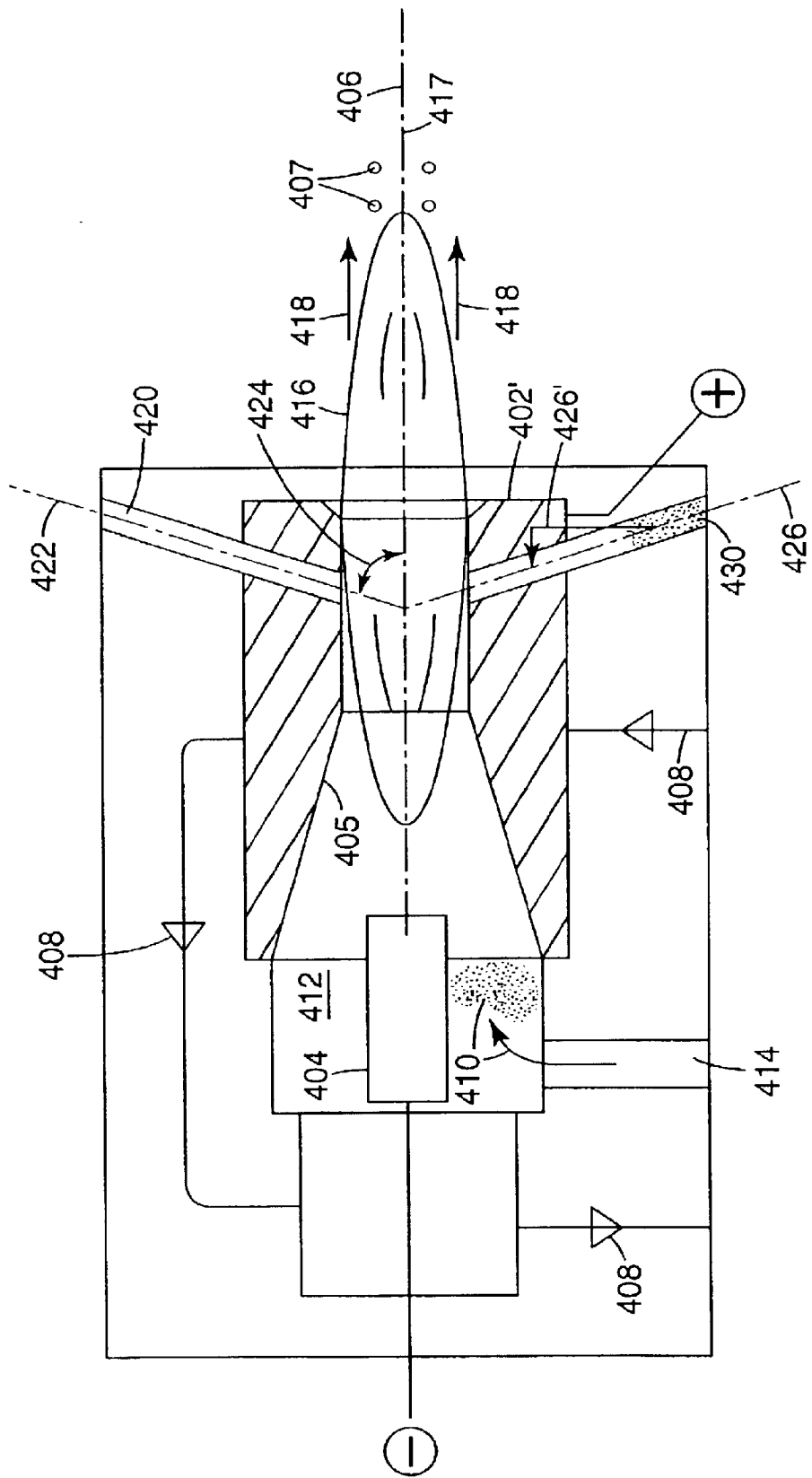
FIG. 4 is a schematic of an exemplary plasma spray apparatus for practicing embodiments of the present invention.

An exemplary, and in some embodiments preferred, thermal spray or plasma spray apparatus 400 including plasma spray gun 401 is diagrammatically illustrated in FIG. 4. Plasma spray gun 401, generally, is adapted to generate plasma gas jet 416 substantially symmetric about jet axis 417. Plasma gas jet 416 contains metal oxide droplets 407.

Plasma spray gun 401 includes housing 403 having nozzle 402 located therein. Nozzle 402 forms nozzle bore 405 adapted to direct and focus plasma gas jet 416 in a delivery direction 418. To produce plasma gas jet 416, plasma spray gun 401 includes various electrodes. For example, in the illustrated embodiment of FIG. 4, first electrode 404 is located proximate an entrance to nozzle 402 and is configured as a cathode (e.g., connected to a negative terminal of a power supply (not shown)). Nozzle 302 may itself form second electrode 402' configured as an anode (e.g., connected to a positive terminal of the power supply). While the actual materials used to form first and second electrodes 404 and 402' may vary, one exemplary embodiment of plasma spray gun 401 utilizes first electrode 404 made from tungsten or tungsten alloy and second electrode 402' (nozzle 402) made from copper or copper alloy.

Those of skill in the art will realize that this electrode configuration is merely exemplary and that other electrode configurations are certainly possible. For example, the polarity and/or material of the first and second electrodes may be different that that described above. Alternatively, for example, second electrode 402' may be independent of nozzle 402. In fact, most any electrode configuration that yields an acceptable plasma spray is possible without departing from the scope of the invention.

Arc gas inlet 414 may be provided to allow for the introduction of arc gas 410 into gas chamber 412 of housing 403. While most any gas complimentary to arc formation is potentially suitable, preferred arc gases include argon, helium, hydrogen, nitrogen, and combinations thereof.

One or more carrier conduits 420 may be formed in housing 403. As further described below, carrier conduits 420 may deliver particles 430 to plasma gas jet 416. While the actual geometry of carrier conduits 420 may vary, they are, in one embodiment, formed by holes drilled to intersect nozzle bore 405. In the illustrated embodiment, each carrier conduit 420 intersects bore 405 at or proximate the smallest diameter of bore 405.

One or more carrier conduits 420 are each preferably symmetric about conduit axis 422. Each conduit axis 422 may intersect jet axis 417 at angle 424 of 75 degrees or less, wherein one or more carrier conduits 420 diverge or extend away from jet axis 417 in delivery direction 418. In some embodiments, angle 424 is preferably 45 degrees to 75 degrees, and more preferably, 60 degrees to 75 degrees.

Other configurations of carrier conduits 420 are also possible without departing from the scope of the invention. For example, conduits 420 may have other (e.g., non-linear) shapes, or they may penetrate bore 405 at a point offset from its centerline. These and other conduit configurations are certainly possible if they are operable to direct particles within conduit 420 to plasma gas jet 416 along particle delivery vector 426, where: particle delivery vector 426 intersects jet axis 417 at angle 424 of 75 degrees or less; and the particle delivery vector 426 comprises vector component 426' having a direction that is substantially opposite delivery direction 418. Once again, in some embodiments, angle 424 is preferably 45 degrees to 75 degrees, and more preferably, 60 degrees to 75 degrees.

Although the term "intersects" is used herein, those of skill in the art will realize that conduit axis 422 may not necessarily be coplanar with jet axis 417 (e.g., one may be skewed with respect to the other). In these instances, it is understood that "intersects" indicates angle 424 between the two axes when the axes are moved parallel to themselves to a common point of intersection.

Having described plasma gas jet 401 in detail, operation of the same in accordance with an exemplary embodiment of the present invention is now described.

Are gas 410 may be introduced into chamber 412 and accelerated through converging bore 405 of nozzle 402 as described above. When first electrode 404 and second electrode 402' are coupled to respective terminals of a power supply, an electric field is created between first electrode 404 and nozzle 402. The resulting plasma gas jet 416 exits housing 403 in delivery direction 418 along jet axis 417, the latter which is substantially parallel and coaxial to axis 406 of nozzle 402. A cooling system, represented by arrows 408 in FIG. 4, may be activated to maintain the temperature of housing 403 at the desired levels.

To generate the desired spray of droplets 407, particles 430 are delivered to the plasma gas jet 416 through carrier conduits 420. In one embodiment, the particles 430 are entrained in a carrier gas that travels through carrier conduits 420 toward the nozzle bore 405. While nitrogen is preferred, other carrier gases may be used. When the metal oxide particles 430 reach plasma gas jet 416, at least a portion are at least partially liquefied to form the desired droplets 407. Droplets 407 may then be cooled and deposited on a substrate or otherwise collected.

By orienting carrier conduits 420 as shown and described herein, particles 430 achieve increased residence time within plasma gas jet 416. This longer residence time allows for the production of courser droplets 407 when compared to droplets produced by existing apparatus and methods.

For embodiments of the invention that do not specify a particular composition particles, any of a variety particulate feed may be used, including amorphous materials, ceramics, metals, etc., known in the art for plasma spraying.

Similarly, for some embodiments of the present invention any of a variety of plasma spraying techniques known in the art may be suitable.

In some embodiments, feed particles for methods according to the present invention, as well as for use with apparatuses according to the present invention include those comprising at least 35 (in some embodiments, preferably at least 40, 45, 50, 55, 60, 65, or even at least 70) percent by weight $Al_2O_3$, based on the total weight of the particles, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles, with the proviso that if the metal oxide other than $Al_2O_3$ is $ZrO_2$, then the particles further comprises a metal oxide other than $Al_2O_3$ and $ZrO_2$.

Embodiments of amorphous material made from such particles comprise at least 35 (in some embodiments, preferably at least 40, 45, 50, 55, 60, 65, or even at least 70) percent by weight $Al_2O_3$, based on the total weight of the amorphous material, and the metal oxide other than (e.g., $Y_2O_3$, REO, $ZrO_2$, $TiO_2$, CaO, $Cr_2O_3$, MgO, NiO, CuO, and complex metal oxides thereof), wherein the amorphous material contains not more than 10 in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the amorphous material, wherein the amorphous material has x, y, and z dimensions each perpendicular to each other, and wherein each of the x, y, and z dimensions is at least 1, 5, 10, 25 micrometers (in some embodiments, preferably, at least at least 30 micrometers, 35 micrometers, 40 micrometers, 45 micrometers, 50 micrometers, 75 micrometers, 100 micrometers, 150 micrometers, 200 micrometers, 250 micrometers. 500 micrometers, 1000 micrometers, 2000 micrometers, 2500 micrometers, 1 mm, 5 mm, or even at least 10 mm), with the proviso that if the metal oxide other than $Al_2O_3$ is $ZrO_2$, then the amorphous material further comprises a metal oxide other than $Al_2O_3$ and $ZrO_2$ that forms at least one distinct crystalline phase when the amorphous material is crystallized. Optionally, if the amorphous material is heat-treated, the invention can provide a glass-ceramic comprising at least 35 (in some embodiments, preferably at least 40, 45, 50, 55, 60, 65, or even at leant 70) percent by weight $Al_2O_3$, based on the total weight of the glass-ceramic, and the metal oxide other than $Al_2O_3$, wherein the glass-ceramic contains not more than 10 in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass-ceramic, wherein the glass-ceramic has x, y, and z dimensions each perpendicular to each other, and wherein each of the x, y, and z dimension is at least 25 micrometers (in some embodiments, preferably, at least at least 30 micrometers, 35 micrometers, 40 micrometers, 45 micrometers, 50 micrometers, 75 micrometers, 100 micrometers, 150 micrometers 200 micrometers, 250 micrometers, 500 micrometers, 1000 micrometers, 2000 micrometers. 2500 micrometers, 1 mm, 5 mm, or even at least 10 mm).

In some embodiments, feed particles for methods according to the present invention, as well as for use with apparatuses according to the present invention include those comprising at least 35 (in some embodiments, preferably at least 40, 45, 50, 55, 60, 65, or even at least 70) percent by weight $Al_2O_3$, based on the total weight of the particles, a first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and a second, different metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the $Al_2O_3$, first metal oxide, and second metal oxide collectively comprise at least 80 (in some embodiments, preferably, at least 85, 90, 95, 97, 98, 99, or even 100) percent by weight of the particles, and wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the particles, with the proviso that if the first or second metal oxide other is $ZrO_2$, then the particles further comprises a metal oxide other than $Al_2O_3$ and $ZrO_2$ that at least a portion of which forms a distinct crystalline phase when the amorphous material is crystallized. Embodiments of amorphous material made from such particles comprise at least 35 (in some embodiments, preferably at least 40, 45, 50, 55, 60, 65, or even at least 70) percent by weight $Al_2O_3$, based on the total weight of the amorphous material, the first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and the second, different metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the $Al_2O_3$, first metal oxide, and second metal oxide collectively comprise at least 80 (in some embodiments, preferably, at least 85, 90, 95, 97, 98, 99, or even 100) percent by weight of the amorphous material, wherein the amorphous material contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the amorphous material. Optionally, if the amorphous material is heat-treated, the invention can provide a glass-ceramic comprising comprise at least 35 (in some embodiments, preferably at least 40, 45, 50, 55, 60, 65, or even at least 70) percent by weight $Al_2O_3$, based on the total weight of the glass-ceramic, the first metal oxide other than $Al_2O_3$, and the second, different metal oxide other than $Al_2O_3$, wherein the $Al_2O_3$, first metal oxide, and second metal oxide collectively comprise at least 80 (in some embodiments, preferably, at least 85, 90, 95, 97, 98, 99, or even 100) percent by weight of the glass-ceramic, wherein the glass-ceramic contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the glass-ceramic.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Other useful metal oxide may also include, on a theoretical oxide basis, BaO, CaO, $Cr_2O_3$, CoO, $Fe_2O_3$, $GeO_2$, $Li_2O$, MgO, MnO, NiO, $Na_2O$, $Sc_2O_3$, SrO, $TiO_2$, ZnO, and combinations thereof. Sources, including commercial sources, include the oxides themselves, complex oxides, ores, carbonates, acetates, nitrates, chlorides, hydroxides, etc. These metal oxides are added to modify a physical property of the resulting abrasive particles and/or improve processing. These metal oxides are typically are added anywhere from 0 to 50% by weight, in some embodiments preferably 0 to 25% by weight and more preferably 0 to 50% by weight of the glass-ceramic depending, for example, upon the desired property.

In some embodiments, it may be advantageous for at least a portion of a metal oxide source (in some embodiments, preferably, 10 15, 20, 25, 30, 35, 40, 45, or even at least 50 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting amorphous material. For example, it is believed that the additional heat generated by the oxidation reaction within the raw material eliminates or minimizes insufficient heat transfer, and hence facilitates formation and homogeneity of the melt, particularly when forming amorphous particles with x, y, and z dimensions aver 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of amorphous material that otherwise could not be made, or could not be made in the desired size range. Another advantage of the invention include, in forming the amorphous materials, that many of the chemical and physical processes such as melting, densification and spherodizing can be achieved in a short time, so that very high quench rates be can achieved. For additional details, see copending application having U.S. Ser. No. 10/211,639 filed the same date as the instant application, the disclosure of which is incorporated herein by reference.

The feed particles for carrying out the process of the invention can be of a variety of sizes, although typically the feed particles have an average size below 100 micrometers, typically in a range of 20–40 micrometers. Excessively small particles can be undesirably difficult to handle, while particles that are too coarse may not completely or uniformly melt. The feed particles can be agglomerated together into particles (i.e., the various raw materials are agglomerated together into particles). Particles made, for example, by plasma spraying or a flame forming process can also be used as feed particles. Surprisingly, amorphous particles generated by plasma spherodization, or flame forming processes are particularly useful feed particles, even with diameters larger than 100 micrometers.

Further, for example, the feed particles may be prepared by dry milling raw materials to provide the desired particle size and/or uniformly of mixture. Particulate, including milled material may be made into a slurry and spray dried to provide feed particles. The feed particles can also be screened to provide a desired particle size distribution.

Further with regard to generating a plasma and melting the feed particles a variety of DC, AC, RF plasma processing systems can be used. For some embodiments, it is preferred that there is sufficient power to uniformly and completely melt the feed particles. Suitable plasma systems useful for the invention typically have about 40 kW of power although smaller or larger systems may be useful depending, for example, on the production demands.

Gases for generating the plasma include those known in the art such as argon, helium, nitrogen, hydrogen, and mixtures thereof. Most commonly, argon gas is used as the plasma gas, but to increase the enthalpy (i.e., the heat content of the plasma, one or more of helium, hydrogen, or nitrogen) may also be added.

The feed particles are commonly introduced into the plasma by a carrier gas. Gases for delivering the feed particles to the plasma gas jet include argon, helium, nitrogen, and mixtures thereof. The carrier gas may be same as the plasma gas (i.e., argon) or it may provide the second or the third gas to modify the energetics of the plasma. Surprisingly, it was found that when nitrogen is used to deliver the particles, the size of the plasma jet increases significantly. The larger plasma jet size is beneficial, for example, because it tends to increased residence time of the feed particles in the plasma jet, and thus enhanced, often desirable heat transfer to the particles, which in turn tends to lead to more complete and homogeneous melt formation, and a denser and stronger plasma sprayed material. It is also possible, for example, to introduce the fed into the plasma along the axis of the plasma jet in the particulate form or as a feed stick (the feed material is formed in to a rod shape and is fed into the plasma slowly as the tip of the rod is molten and broken into droplets, which are then sprayed by the plasma jet)

In some embodiments, the feed particles can be introduced into the plasma just outside of the gun. Although not wanting to be bound by theory, it is believed that feeding the feed particles into the plasma through an orifice machined in the anode of the plasma gun desirably increases the residence time or the interaction of the particles in the plasma. In another aspect, some cases, although not wanting to be bound by theory, it is believed that the residence time or the interaction of the feed particles in the plasma may be desirably changed (e.g., increased) by orienting the orifice towards the front or back of the gun at an angle (e.g., at least 10, 20 or 30 degrees, etc.).

In another aspect of the invention, the plasma processing may be carried out in air, in a blanket of gasses, at higher or lower pressures, even under vacuum.

The melt from the plasma is typically sprayed onto a substrate or into a liquid (e.g., water), although the liquid may also be on a substrate. The substrate or liquid aid in cooling the melt. In some cases, it is desirable to provide a coating onto a substrate. In other cases, the substrate may be merely serving to cool and collect material which is subsequently removed from the substrate (e.g., bulk material is provided). It is understood that then substrate is selected to be of sufficient integrity to withstand the heat from the plasma. Common substrate materials are metals and ceramics. With regard to using liquid to cool the plasma sprayed melt, the result is typically particulate, most commonly in the form of spheres or beads (e.g., in some embodiments having a diameter(s) in a range from about 1, to at least 150 micrometers). Although for some embodiments of the invention that specify particular compositions of the particles, embodiments are directed to amorphous materials, for those not specifying particular compositions, the resulting plasma sprayed material may be amorphous material or crystalline material (including nanosized crystal and coarser).

Surprisingly, embodiments of the present invention can provide amorphous materials having x, y, and z dimensions each perpendicular to each other, wherein each of the x, y, and z dimensions is at least 1, 5, 10, 25 micrometers (in some embodiments, preferably, at least at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm).

The microstructure or phase composition (glassy/amorphous/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous yield can be calculated for beads using a −100+120 mesh size fraction (i.e., the fraction collected between 150-micrometer opening size and 125-micrometer opening size screens). The measurements are done in the following manner. A single layer of beads is spread out upon a glass slide. The beads are observed using an optical microscope. Using the crosshairs in the optical microscope eyepiece as a guide, beads that lay along a straight line are counted either amorphous or crystalline depending on their optical clarity. A total of 500 beads are counted and a percent amorphous yield is determined by the amount of amorphous beads divided by total beads counted.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected, between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix.

For some uses of the plasma sprayed material, for example, abrasive particles and fillers, the as formed amorphous material or ceramic (including glass prior to crystallization) may be larger in size than that desired. The amorphous material or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in a form larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material, for example, for plasma spraying-melting if they are too small.

The shape of the ceramic (including glass prior to crystallization) may depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. The resulting particle may have an average aspect ratio ranging from 1:1 to 5:1, typically 1.25:1 to 3:1 and preferably 1.5:1 to 2.5:1.

It is also within the scope of the present invention, for example, to fabricate ceramics (including glass prior to crystallization) by coalescing. This coalescing step in essence forms a larger sized body from two or more smaller particles. For example, amorphous material comprising particles (obtained, for example, by crushing) (including beads and microspheres), fibers, etc. may formed into a larger particle size. For example, ceramic (including glass prior to crystallization), may also be provided by heating, for example, particles comprising the amorphous material, and/or fibers, etc. above the $T_g$ such that the particles, etc. coalesce to form a shape and cooling the coalesced shape. The temperature and pressure used for coalescing may depend, for example, upon composition of the amorphous material and the desired density of the resulting material. The temperature should below glass crystallization temperature, and for glasses, greater than the glass transition temperature. In certain embodiments, the heating is conducted at at least one temperature in a range of about 850° C. to about 1100° C. (in some embodiments, preferably 900° C. to 1000° C.). Typically, the amorphous material is under pressure (e.g., greater than zero to 1 GPa or more) during coalescence to aid the coalescence of the amorphous material. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressure, hot extrusion and the like. Typically, it is generally preferred to cool the resulting coalesced body before further heat treatment. After heat treatment if so desired, the coalesced body may be crushed to smaller particle sizes or a desired particle size distribution.

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material. Optionally, the resulting, coalesced article can be heat-treated to provide glass-ceramic, crystalline ceramic, or ceramic otherwise comprising crystalline ceramic.

If a crystalline or partially crystalline material is desired, it is preferred to heat treat the amorphous material. Heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material is fed directly into a kiln operating at the elevated temperature. The time at the elevated temperature may range from a few seconds (in some embodiments even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, preferably in a range from about 925° C. to about 1050° C. Likewise for the density step, the temperature typically is in a range from about 1100° C. to about 1600° C., in some embodiments, preferably in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. It is within the scope of the present invention to convert (e.g., crush) the resulting article or heat-treated article to provide particles (e.g., abrasive particles).

The amorphous material is heat-treated to at least partially crystallize the amorphous material to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for amorphous materials made according to the present invention, determine the appropriate nucleation and/or crystal growth conditions to provide glass-ceramics of the abrasive particles.

Typically, glass-ceramics are stronger than the amorphous materials from which they are formed. Hence, the strength of the material may be adjusted, for example, by the degree to which the amorphous material is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example *Glass-Ceramics*, P. W. McMillan, Academic Press, Inc., $2^{nd}$ edition, 1979, the disclosure of which is incorporated herein by reference.

For example, during heat-treatment of some exemplary amorphous materials made according to methods according to present invention for making the glass-ceramics, formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the amorphous material. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10–15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The size of the resulting crystals can typically controlled at least in part by the nucleation and/or crystallization times and/or temperatures. Although it is generally preferred to have small crystals (e.g., on the order not greater than a micrometer, or even not greater than a nanometer) the glass-ceramics may be made with larger crystal sizes (e.g., at least 1–10 micrometers, at least 10–25 micrometers, at least 50–100 micrometers, or even greater than 100 micrometers). Although not wanting to be bound by theory, it is generally believed in the art that the finer the size of the crystals (for the same density), the higher the mechanical properties (e.g., hardness and strength) of the ceramic.

Examples of crystalline phases which may be present in embodiments of glass-ceramics include: $Al_2O_3$ (e.g., $\alpha$—$Al_2O_3$), $Y_2O_3$, REO, $HfO_2$ $ZrO_2$ (e.g., cubic $ZrO_2$ and tetragonal $ZrO_2$), BaO, CaO, $Cr_2O_3$, CoO, $Fe_2O_3$, $GeO_2$, $Li_2O$, MgO, MnO, NiO, $Na_2O$, $P_2O_5$, $Sc_2O_3$, $SiO_2$, SrO, $TeO_2$, $TiO_2$, $V_2O_3$, $Y_2O_3$, ZnO, "complex metal oxides" (including "complex $Al_2O_3$.metal oxide (e.g., complex $Al_2O_3$.REO (e.g., $ReAlO_3$ (e.g., $GdAlO_3$ $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3.Y_2O_3$ (e.g., $Y_3Al_5O_{12}$), and complex $ZrO_2$.REO (e.g., $Re_2Zr_2O_7$ (e.g., $La_2Zr_2O_7$))), $MgAl_2O_4$, $TiAl_3O_5$, and combinations thereof.

It is also with in the scope of the present invention to substitute a portion of the yttrium and/or aluminum cations in a complex $Al_2O_3$metal oxide (e.g., complex $Al_2O_3.Y_2O_3$ (e.g., yttrium aluminate exhibiting a garnet crystal structure)) with other cations. For example, a portion of the Al cations in a complex $Al_2O_3.Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3.Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

It is also with in the scope of the present invention to substitute a portion of the rare earth and/or aluminum cations in a complex $Al_2O_3$.metal oxide (e.g., complex $Al_2O_3$.REO) with other cations. For example, a portion of the Al cations in a complex $Al_2O_3$.REO may be substituted with at least one cation of an element selected from the group consisting of: Cr, Ti, Sc, Fe, Mg, Ca, Si, Co, and combinations thereof. For example, a portion of the Y cations in a complex $Al_2O_3$.REO may be substituted with at least one cation of an element selected from the group consisting of: Y, Fe, Ti, Mn, V, Cr, Co, Ni, Cu, Mg, Ca, Sr, and combinations thereof. Similarly, it is also with in the scope of the present invention to substitute a portion of the aluminum cations in alumina. For example, Cr, Ti, Sc, Fe, Mg, Ca, Si, and Co can substitute for aluminum in the alumina. The substitution of cations as described above may affect the properties (e.g. hardness, toughness, strength, thermal conductivity, etc.) of the fused material.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystal size as follows. The number of crystals that intersect per unit length ($N_L$) of a random straight line drawn across the micrograph are counted. The average crystal size is determined from this number using the following equation.

$$\text{Average Crystal Size} = \frac{1.5}{N_L M}$$

Where $N_L$ is the number of crystals intersected per unit length and M is the magnification of the micrograph.

Some embodiments of the glass-ceramics include glass-ceramics comprising alpha alumina having at least one of an average crystal size not greater than 150 nanometers.

Some embodiments of the glass-ceramics include glass-ceramics comprising alpha alumina, wherein at least 75 (in some embodiments preferably, 80, 85, 90, 95, or even 100) percent by number of the alpha alumina present in such portion have crystal sizes not greater than 200 nanometers.

Some embodiments of the glass-ceramics include glass-ceramics comprising alpha $Al_2O_3$, crystalline $ZrO_2$, and a first complex $Al_2O_3.Y_2O_3$, and wherein at least one of the alpha $Al_2O_3$, the crystalline $ZrO_2$, or the first complex $Al_2O_3.Y_2O_3$ has an average crystal size not greater than 150 nanometers. In some embodiments preferably, the glass-ceramics further comprise a second, different complex $Al_2O_3.Y_2O_3$. In some embodiments preferably, the glass-ceramics further comprise a complex $Al_2O_3.REO$.

Some embodiments of the glass-ceramics include glass-ceramics comprising a first complex $Al_2O_3.Y_2O_3$, a second, different complex $Al_2O_3.Y_2O_3$, and crystalline $ZrO_2$ wherein for at least one of the first complex $Al_2O_3.Y_2O_3$, the second complex $Al_2O_3.Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a second, different complex $Al_2O_3.Y_2O_3$. In some embodiments preferably, the glass-ceramics further comprise a complex $Al_2O_3.REO$.

Some embodiments of the glass-ceramics include glass-ceramics comprising alpha $Al_2O_3$, crystalline $ZrO_2$, and a first complex $Al_2O_3.REO$, and wherein at least one of the alpha $Al_2O_3$, the crystalline $ZrO_2$, or the first complex $Al_2O_3.REO$ has an average crystal size not greater than 150 nanometers. In some embodiments preferably, the glass-ceramics further comprise a second, different complex $Al_2O_3.REO$. In some embodiments preferably, the glass-ceramics further comprise a complex $Al_2O_3.Y_2O_3$.

Some embodiments of the glass-ceramics include glass-ceramics comprising a first complex $Al_2O_3.REO$, a second, different complex $Al_2O_3.REO$, and crystalline $ZrO_2$, and wherein for at least one of the first complex $Al_2O_3.REO$, the second complex $Al_2O_3.REO$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.Y_2O_3$.

Some embodiments of the glass-ceramics include glass-ceramics comprising a first complex $Al_2O_3.Y_2O_3$, a second, different complex $Al_2O_3.Y_2O_3$, and crystalline $ZrO_2$, and wherein at least one of the first complex $Al_2O_3.Y_2O_3$, the second, different complex $Al_2O_3.Y_2O_3$, or the crystalline $ZrO_2$ has an average crystal size not greater than 150 nanometers. In some embodiments preferably, the glass-ceramics further comprise a second, different complex $Al_2O_3.Y_2O_3$. In some embodiments preferably, the glass-ceramics further comprise a complex $Al_2O_3.REO$.

Some embodiments of the glass-ceramics include glass-ceramics comprising a first complex $Al_2O_3.Y_2O_3$, a second, different complex $Al_2O_3.Y_2O_3$, and crystalline $ZrO_2$, and wherein for at least one of the first complex $Al_2O_3.Y_2O_3$, the second, different complex $Al_2O_3.Y_2O_3$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.REO$.

Some embodiments of the glass-ceramics include glass-ceramics comprising a first complex $Al_2O_3.REO$, a second, different complex $Al_2O_3.REO$, and crystalline $ZrO_2$, and wherein at least one of the first complex $Al_2O_3.REO$, the second, different complex $Al_2O_3.REO$, or the crystalline $ZrO_2$ has an average crystal size not greater than 150 nanometers. In some embodiments preferably, the glass-ceramics further comprise a second, different complex $Al_2O_3.REO$. In some embodiments preferably, the glass-ceramics further comprise a complex $Al_2O_3.Y_2O_3$.

Some embodiments of the glass-ceramics include glass-ceramics comprising a first complex $Al_2O_3.REO$, a second, different complex $Al_2O_3.REO$, and crystalline $ZrO_2$, and wherein for at least one of the first complex $Al_2O_3.REO$, the second, different complex $Al_2O_3.REO$, or the crystalline $ZrO_2$, at least 75 (in some embodiments preferably, 80, 85, 90, 95, or even 100) percent by number of the crystal sizes thereof are not greater than 200 nanometers. In some embodiments preferably, the glass-ceramics further comprise a complex $Al_2O_3.Y_2O_3$.

In some embodiments, glass-ceramics made according to the present invention comprise at least 75, 80, 85, 90, 95, 97, 98, 99, or even 100 percent by volume crystallites, wherein the crystallites have an average size of less than 1 micrometer. In some embodiments, glass-ceramics made according to the present invention comprise not greater than at least 75, 80, 85, 90, 95, 97, 98, 99, or even 100 percent by volume crystallites, wherein the crystallites have an average size not greater than 0.5 micrometer. In some embodiments, glass-ceramics made according to the present invention comprise less than at 75, 80, 85, 90, 95, 97, 98, 99, or even 100 percent by volume crystallites, wherein the crystallites have an average size not greater than 0.3 micrometer. In some embodiments, the glass-ceramics comprise less than at least 75, 80, 85, 90, 95, 97, 98, 99, or even 100 percent by volume crystallites, wherein the crystallites have an average size not greater than 0.15 micrometer.

Crystals formed by heat-treating amorphous material made according to methods of the present invention to provide embodiments of glass-ceramics may be, for example, equiaxed, acicular, columnar, or flattened splat-like features.

Typically, the (true) density, sometimes referred to as specific gravity, of amorphous and ceramics made according to methods of the present is at least 70% of theoretical density. More desirably, the (true) density of ceramics made according to methods of the present invention is at least 75%, 80%, 85%, 90%, 92%, 95%, 96%, 97%, 98%, 99%, 99.5% or even 100% of theoretical density. The abrasive particles have (true) densities of at least 85%, 90%, 92%, 95%, 96%, 97%, 98%, 99%, 99.5% or even 100% of theoretical density.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference.

In some embodiments, the average hardness of glass-ceramics made according to methods of the present invention is at least 12, 13, 14, 15, 16, 17, or even at least 18 Gpa Abrasive particles made according to the present invention have an average hardness of at least 15 GPa, in some embodiments. at least 16 GPa, at least 17 GPa, or even at least 18 GPa.

Additional details regarding amorphous materials, glass-ceramics, including making, using, and properties thereof, can be found in application having U.S. Ser. Nos. 09/922, 526, 09/922,527, and 09/922,530, filed Aug. 2, 2001, and U.S. Ser. Nos. 10/211,598; 10/211,630, 10/211,639; 10/211, 034; 10/211,044; 10/211,620; and 10/211,684 the disclosures of which are incorporated herein by reference.

Embodiments of amorphous material, glass-ceramic, etc. made according to the present invention may in some embodiments desirably comprise a composite. Such a composite may comprise, for example, a phase or particulate (e.g., metal oxide particles, boride particles, carbide particles, nitride particles, diamond particles, metallic particles, glass particles, and combinations thereof) dispersed in an amorphous material, glass-ceramic, etc. made according to the present invention, invention or a layered-composite structure (e.g., a gradient of glass-ceramic to amorphous material used to make the glass-ceramic and/or layers of different compositions of glass-ceramics). In making composites comprising a phase or particulate dispersed in an amorphous material, glass-ceramic, etc. made according to the present invention, the feed particles having compositions of the invention are typically mixed with the feed particles of the particles to be dispersed. The particles or phases may also, for example, be dispersed in the amorphous or glass-ceramic compositions of the invention may simply have a different particle size, composition or thermal history than the feed particles of the matrix phase. Layered composites can be made, for example, by changing the composition of the feed particles over time to provide a layer having different compositions along its thickness. In addition, or alternatively, for example, an amorphous layer can be deposited and heat-treated after which another layer of the same or a different composition can be deposited.

In some embodiments, a gradient structure can be formed so that the thermal expansion mismatch between the substrate and the coatings can be gradually changed along the coating thickness, so that spalling of coatings can be desirably reduced.

It is within the scope of the invention to apply intermediate (e.g., a metallic or intermetallic) coating layers between the substrate and an amorphous layer, for example, to improve adhesion, or to eliminate thermal, mechanical or chemical incompatibility between them.

The following are some exemplary embodiments of materials that can be made by embodiments of methods according to the present invention. One embodiment is a composite material comprising discrete crystalline regions within an amorphous (continuous) matrix, wherein the crystalline regions and the amorphous material each independently comprise at least 35 (in some embodiments, preferably at least 40, 45, 50, 55, 60, 65, or even at least 70) percent by weight $Al_2O_3$, based on the total weight of the crystalline regions and the amorphous matrix, respectively, and a metal oxide other than $A_2O_3$ (e.g., $Y_2O_3$, REQ. $ZrO_2$, $TiO_2$, CaO, $Cr_2O_3$, MgO, NiO, CuO, and complex metal oxides thereof), wherein the crystalline regions and the amorphous matrix each contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the crystalline regions and the amorphous matrix, respectively, and wherein the composite material has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm. 5 mm, or even at least 10 mm). The x, y, and z dimensions of a material are determined either visually or using microscopy, depending on the magnitude of the dimensions. The reported z dimension is, for example, the diameter of a sphere, the thickness of a coating, or the longest length of a prismatic shape. In some embodiments, the interface between the discrete crystalline regions may be diffuse to some extent, for example due to reaction between the a discrete crystalline region and the amorphous matrix. In some embodiments, the discrete crystalline regions have an average crystal size nut greater than 200 nanometers.

In some embodiments, for example, the composition of the discrete crystalline region and the amorphous matrix are the same, while in others they are different.

In some embodiments, the metal oxide other than $Al_2O_3$ for at least one of the discrete crystalline regions or the amorphous matrix is $ZrO_2$, wherein in some preferred embodiments, at least one of the discrete crystalline regions or the amorphous matrix comprises $Al_2O_3$ in a range of about 55 to about 65 percent by weight to a range of about 45 to about 35 percent by weight $ZrO_2$, based on the total $Al_2O_3$ and $ZrO_2$ content of the discrete crystalline regions or the amorphous matrix, as applicable.

In some embodiments, at least one of the discrete crystalline regions or the amorphous matrix further comprises (e.g., greater than 0 to 50 percent by weight, based on the total weight of the at least one of the discrete crystalline regions or the amorphous material, as applicable) additional metal oxide(s) (e.g., $Y_2O_3$, REO, $ZrO_2$, $TiO_2$, CaO, $Cr_2O_3$, MgO, NiO, CuO, and complex metal oxides thereof). In some embodiments, at least one of the discrete crystalline regions or the amorphous matrix comprises $Al_2O_3$, $Y_2O_3$, and $ZrO_2$. In some embodiments, at least one of the discrete crystalline regions or the amorphous matrix comprises $Al_2O_3$, REO, and $ZrO_2$.

In some embodiments, the composite material is in the form of a layer. In some embodiments, a composite layer comprises an amorphous layer and a layer of the composite material. Compositions of the amorphous layer include those disclosed in the instant application.

In some embodiments, the composite material comprises a first portion and a second portion, wherein the first portion has an average number of the discrete crystalline regions per $mm^3$, wherein the second portion has an average number of the discrete crystalline regions per $mm^3$, and wherein the average number of the discrete crystalline regions per $mm^3$ of the first portion is than greater (in some embodiments at least 25, 50, 75, 100, 150, 200, or even at least 500 percent by volume greater than) the average number of the discrete crystalline regions per $mm^3$ of the second portion. Further, for example, in some embodiments, the composite material comprises a third portion disposed between the first and second portions, wherein the third portion has an average number of the discrete crystalline regions per $mm^3$, and wherein the average number of the discrete crystalline regions per $mm^3$ of the third portion is greater than (in some embodiments at least 25, 50, 75, 100, 150, 200, or even at least 500 percent by volume greater than) the average number of the discrete crystalline regions per $mm^3$ of the second portion, and less than the average number of the discrete crystalline regions per $mm^3$ of the first portion.

Another exemplary embodiment is a composite material comprising discrete crystalline regions within an amorphous matrix, wherein the crystalline regions and the amorphous matrix each independently comprise at least 35 (in some embodiments, preferably at least 40, 45, 50, 55, 60, 65, or even at least 70) percent by weight $Al_2O_3$, based on the total weight of the discrete crystalline regions and the amorphous matrix, a first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and a second, different metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the $Al_{2O3}$, first metal oxide, and second metal oxide collectively comprise at least 80 (in some embodiments, preferably, at least 85, 90, 95, 97, 98, 99, or even 100) percent by weight of the discrete crystalline regions and the amorphous matrix, and wherein the discrete crystalline regions and the amorphous matrix contain not more than 10 (in some embodiments, preferably not more than 5, 4, 3, 2, 1, or zero) percent by weight collectively $As_2O_3$, $B_2O_3$, $GeO_2 P_2O_5$, $SiO_2$, $TeO_2$, and $V_2O_5$, base on the total weight of the discrete crystalline regions and the amorphous matrix, with the proviso with the proviso that if the first or second metal oxide other than $Al_2O_3$ of the discrete crystalline regions is $ZrO_2$, then the discrete crystalline regions further comprise a metal oxide other than $A_2O_3$ and $ZrO_2$ that at least a portion of which is present as a distinct crystalline phase, and with the proviso that if the first or second metal oxide other than $Al_2O_3$ of the amorphous matrix is $ZrO_2$, then the amorphous matrix further comprises a metal oxide other than $Al_2O_3$ and $ZrO_2$ that at least a portion of which forms a distinct crystalline phase when the amorphous matrix is crystallized. In some embodiments, the composite material has x, y, and z dimensions each perpendicular to each other, and wherein each of the x, y and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10 mm). In same embodiments, the discrete crystalline regions have an average crystal size not greater than 200 nanometers.

In some embodiments, for example, the composition of the discrete crystalline region and the amorphous matrix are the same, while in others they are different.

In some embodiments, the metal oxide other than $Al_2O_3$ for at least one of the discrete crystalline regions or the amorphous matrix is $ZrO_2$, wherein in some preferred embodiments, at least one of the discrete crystalline regions or the amorphous matrix comprises $Al_2O_3$ in a range of about 55 to about 65 percent by weight to a range of about 45 to about 35 percent by weight $ZrO_2$, based on the total $Al_2O_3$ and $ZrO_2$ content of the discrete crystalline regions or the amorphous matrix, as applicable.

In some embodiments, at least one of the discrete crystalline regions or the amorphous matrix further comprises (e.g., greater than 0 to 50 percent by weight, based on the total weight of the at least one of the discrete crystalline regions or the amorphous matrix, as applicable) additional metal oxide(s) (e.g., $Y_2O_3$, REO, $ZrO_2$, $TiO_2$, CaO, $Cr_2O_3$, MgO, NiO, CuO, and complex metal oxides thereof). In some embodiments, at least one of the discrete crystalline regions or the amorphous matrix comprises $Al_2O_3$, $Y_2O_3$, and $ZrO_2$. In some embodiments, at least one of the discrete crystalline regions or the amorphous matrix comprises $Al_2O_3$, REO, and $ZrO_2$.

In some embodiments, the composite material is in the form of a layer. In some embodiments, a composite layer comprises an amorphous layer and a layer of the composite material. Compositions of the amorphous layer include those disclosed in the instant application.

In some embodiments, the composite material comprises a first portion and a second portion, wherein the first portion has an average number of the discrete crystalline regions per $mm^3$, wherein the second portion has an average number of the discrete crystalline regions per $mm^3$, and wherein the average number of the discrete crystalline regions per $mm^3$ of the first portion is than greater (in some embodiments at least 25, 50, 75, 100, 150, 200, or even at least 500 percent by volume greater than) the average number of the discrete crystalline regions per $mm^3$ of the second portion. Further, for example, in some embodiments, the composite material comprises a third portion disposed between the first and second portions, wherein the third portion has an average number of the discrete crystalline regions per $mm^3$, and wherein the average number of the discrete crystalline regions per $mm^3$ of the third portion is greater than (in some embodiments at least 25, 50, 75, 100, 150, 200, or even at least 500 percent by volume greater than) the average number of the discrete crystalline regions per $mm^3$ of the second portion, and less than the average number of the discrete crystalline regions per $mm^3$ of the first portion.

Another exemplary embodiment is a composite ceramic comprising discrete crystalline regions in a glass-ceramic matrix, wherein the discrete crystalline regions and the glass-ceramic matrix independently comprise at least 35 (in some embodiments, preferably at least 40, 45, 50, 55, 60, 65, or even at least 70) percent by weight $Al_2O_3$ (e.g., $Y_2O_3$, REO, $ZrO_2$, $TiO_2$, CaO, $Cr_2O_3$, MgO, NiO, CuO, and complex metal oxides thereof), based on the total weight of the crystalline regions and the glass-ceramic matrix, respectively, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the discrete crystalline regions and the glass-ceramic matrix each contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the discrete crystalline regions and the glass-ceramic matrix, respectively, and wherein the composite ceramic has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10 mm). In some embodiments, at least 50, 60, 70, 75, 80, 90, or even at least 95 percent by volume of the glass-ceramic is crystalline. In some embodiments, the glass-ceramic and/or the discrete crystalline regions have an average crystal size not greater than 200 nanometers.

In some embodiments, the metal oxide other than $Al_2O_3$ for at least one of the discrete crystalline regions or the glass-ceramic is $ZrO_2$, wherein in some preferred embodiments, at least one of the discrete crystalline regions or the glass-ceramic comprises $Al_2O_3$ in a range of about 55 to about 65 percent by weight to a range of about 45 to about 35 percent by weight $ZrO_2$, based on the total $Al_2O_3$ and $ZrO_2$ content of the discrete crystalline regions or the glass-ceramic, as applicable.

In some embodiments, at least one of the discrete crystalline regions or the glass-ceramic further comprises (e.g., greater than 0 to 50 percent by weight, based on the total weight of the at least one of the discrete crystalline regions or the glass-ceramic, as applicable) additional metal oxide(s) (e.g., $Y_2O_3$, REO, $ZrO_2$, $TiO_2$, CaO, $Cr_2O_3$, MgO, NiO, CuO, and complex metal oxides thereof). In some embodiments, at least one of the discrete crystalline regions or the glass-ceramic comprises $Al_2O_3$, $Y_2O_3$, and $ZrO_2$. In some embodiments, at least one of the discrete crystalline regions or the glass-ceramic comprises $Al_2O_3$, REO, and $ZrO_2$.

In some embodiments, the composite ceramic is in the form of a layer. In some embodiments, a composite layer comprises an amorphous layer and a layer of the composite ceramic. Compositions of the amorphous layer include those disclosed in the instant application.

Another exemplary embodiment is a composite ceramic comprising discrete crystalline regions in a glass-ceramic matrix, wherein the discrete crystalline regions and the glass-ceramic matrix independently comprise at least 35 (in some embodiments, preferably at least 40, 45, 50, 55, 60, 65, or even at least 70) percent by weight $Al_2O_3$, based on the total weight of the discrete crystalline regions and the amorphous matrix, a first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and a second, different metal oxide other than $Al_2O$ (e.g., $Y_2O_3$, REO, $ZrO_2$, $TiO_2$, CaO, $Cr_2O_3$, MgO, NiO, CuO, and complex metal oxides thereof), wherein the $Al_2O_3$, first metal oxide, and second metal oxide collectively comprise at least 80 (in some embodiments, preferably, at least 85, 90, 95, 97, 98, 99, or even 100) percent by weight of the discrete crystalline regions and the glass-ceramic matrix, and wherein the discrete crystalline regions and the glass-ceramic matrix contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the discrete crystalline regions and the glass-ceramic matrix, with the proviso that if the first or second metal oxide other than $Al_2O_3$ of the discrete crystalline regions is $ZrO_2$, then the discrete crystalline regions further comprise a metal oxide other than $A_2O_3$ and $ZrO_2$ that at least a portion of which is present as a distinct crystalline phase, and with the proviso that if the first or second metal oxide other than $A_2O_3$ of the glass-ceramic matrix is $ZrO_2$, then the glass-ceramic matrix further comprises a metal oxide other than $Al_2O_3$ and $ZrO_2$ that at least a portion of which is present as a distinct crystalline phase when the amorphous matrix is crystallized. In some embodiments, the composite ceramic has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10 mm). In some embodiments, at least 50, 60, 70, 75, 80, 90, or even at least 95 percent by volume of the glass-ceramic is crystalline. In some embodiments, the glass-ceramic and/or the discrete crystalline regions have an average crystal size not greater than 200 nanometers.

In some embodiments, the metal oxide other than $Al_2O_3$ for at least one of the discrete crystalline regions or the glass-ceramic is $ZrO_2$, wherein in some preferred embodiments, at least one of the discrete crystalline regions or the glass-ceramic comprises $Al_2O_3$ in a range of about 55 to about 65 percent by weight to a range of about 45 to about 35 percent by weight $ZrO_2$, based on the total $Al_2O_3$ and $ZrO_2$ content of the discrete crystalline regions or the glass-ceramic, as applicable.

In some embodiments at least one of the discrete crystalline regions or the glass-ceramic further comprises (e.g., greater than 0 to 50 percent by weight, based on the total weight of the at least one of the discrete crystalline regions or the glass-ceramic, as applicable) additional metal oxide(s) (e.g., $Y_2O_3$, REO, $ZrO_2$, $TiO_2$, CaO, $Cr_3O_2$, MgO, NiO, CuO, and complex metal oxides thereof). In some embodiments, at least one of the discrete crystalline regions or the glass-ceramic comprises $Al_2O_3$, $Y_2O_3$, and $ZrO_2$. In some embodiments, at least one of the discrete crystalline regions or the glass-ceramic comprises $Al_2O_3$, REQ, and $ZrO_2$.

In some embodiments, the composite ceramic is in the form of a layer. In some embodiments, a composite layer comprises an amorphous layer and a layer of the composite ceramic. Compositions of the amorphous layer include those disclosed in the instant application.

Another exemplary embodiment is a glass-ceramic layer having first and second opposite surfaces, a first ceramic compositional region comprising at least 35 (in some embodiments, preferably at least 40, 45, 50, 55, 60, 65, or even at least 70) percent by weight $Al_2O_3$, based on the total weight of the first ceramic compositional region, and a metal oxide other than $Al_2O_3$, wherein first ceramic compositional region contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the first ceramic compositional region, and a second ceramic compositional region comprising at least 35 (in some embodiments, preferably at least 40, 45, 50, 55, 60, 65, or even at least 70) percent by weight $Al_2O_3$, based on the total weight of the second ceramic compositional region, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein the second ceramic compositional region contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the second ceramic compositional region, wherein the first ceramic compositional region is closer to the first surface than it is to the second surface, and wherein the second ceramic compositional region is closer to the second surface than it is to the first surface, and wherein the first compositional region has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10mm).

In some embodiments, the metal oxide other than $Al_2O_3$ for at least one of the first or second ceramic compositional regions is $ZrO_2$, wherein in some preferred embodiments, at least one of the first or second ceramic compositional regions comprises $Al_2O_3$ in a range of about 55 to about 65 percent by weight to a range of about 45 to about 35 percent by weight $ZrO_2$, based on the total $Al_2O_3$ and $ZrO_2$ content of the first or second ceramic compositional regions, as applicable.

In some embodiments, at least one of the first or second ceramic compositional regions further comprises (e.g., greater than 0 to 50 percent by weight, based on the total weight of the at least one of the first or second ceramic compositional regions, as applicable) additional metal oxide(s) (e.g., $Y_2O_3$, REO, $ZrO_2$, $TiO_2$, CaO, $Cr_2O_3$, MgO, NiO, CuO, and complex metal oxides thereof), In some embodiments, at least one of the first or second ceramic compositional regions material comprises $Al_2O_3$, $Y_2O_3$, and $ZrO_2$. In some embodiments, at least one of first or second ceramic compositional regions comprises $Al_2O_3$, REO, and $ZrO_2$.

In some embodiments, a composite layer comprises an amorphous layer and the ceramic layer. Compositions of the amorphous layer include those disclosed in the instant application.

In some embodiments, for example, the first ceramic compositional region is amorphous, and the second ceramic compositional region is at least partially crystalline. In some embodiments, for example, the composition of the first and ceramic compositional regions are the same, while in others they are different.

Another exemplary embodiment is a glass-ceramic layer having first and second opposite surfaces, a first ceramic compositional region and a second compositional region each independently comprise at least 35 (in some embodiments, preferably at least 40, 45, 50, 55, 60, 65, or even at least 70) percent by weight $Al_2O_3$, based on the total weight of the first or second compositional region, respectively, a first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and a second, different metal oxide other than $Al_2O_3$ (e.g., $Y_2O_3$, REO, $ZrO_2$, $TiO_2$, CaO, $Cr_2O_3$, MgO, NiO), CuO, and complex metal oxides thereof), wherein the $Al_2O_3$, first metal oxide, and second metal oxide collectively comprise at least 80 (in some embodiments, preferably, at least 85, 90, 95, 97, 98, 99, or even 100) percent by weight of the first or second compositional region, respectively, and wherein the first or second compositional region, respectively, contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the first or second compositional region, respectively, with the proviso that if the first or second metal oxide other than $Al_2O_3$ of the first or second compositional region, respectively, is $ZrO_2$ then the first or second compositional region, respectively, further comprises a metal oxide other than $Al_2O_3$ and $ZrO_2$ that at least a portion of which is present as a distinct crystalline phase. In some embodiments, the composite material has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10 mm).

In some embodiments, the metal oxide other than $Al_2O_3$ for at least one of the first or second ceramic compositional regions is $ZrO_2$, wherein in some preferred embodiments, at least one of the first or second ceramic compositional regions comprises $Al_2O_3$ in a range of about 55 to about 65 percent by weight to a range of about 45 to about 35 percent by weight $ZrO_2$, based on the total $Al_2O_3$ and $ZrO_2$ content of the first or second ceramic compositional regions, as applicable.

In some embodiments at least one of the first or second ceramic compositional regions further comprises (e.g., greater than 0 to 50 percent by weight, based on the total weight of the at least one of the first or second ceramic compositional regions, as applicable) additional metal oxide(s) (e.g., $Y_2O_3$, REO, $ZrO_2$, $TiO_2$, CaO, $Cr_2O_3$, MgO, NiO, CuO, and complex metal oxides thereof), In some embodiments, at least one of the first or second ceramic compositional regions material comprises $Al_2O_3$, $Y_2O_3$, and $ZrO_2$). In some embodiments, at least one of first or second ceramic compositional regions comprises $Al_2O_3$, REO, and $ZrO_2$.

In some embodiments, a composite layer comprises an amorphous layer and the ceramic layer. Compositions of the amorphous layer include those disclosed in the instant application.

In some embodiments, for example, the first ceramic compositional region is amorphous, and the second ceramic compositional region is at least partially crystalline. In some embodiments, for example, the composition of the first and ceramic compositional regions are the same, while in others they are different.

Another exemplary embodiment is a ceramic comprising at least 35 (in some embodiments, preferably at least 40, 45, 50, 55, 60, 65, or even at least 70) percent by weight $Al_2O_3$, based on the total weight of the ceramic, and a metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), wherein ceramic layer contains not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the ceramic, the ceramic having first and second crystalline comprising regions having first and second degrees of crystallinity, respectively, wherein the degree of crystallinity of the first region is greater than (e.g., at least 25, 50, 75, 100, 150, 200, or even at least 500 percent by volume) the degree of crystallinity of the second region, and wherein the first region has x, y, and z dimensions each perpendicular to each other, and wherein each of the x, y, and z dimensions is at least 150 micrometers(in some embodiments, preferably, at least 200 micrometers, 250 micrometers, 500 micrometers, 1000 micrometers, 2000 micrometers, 2500 micrometers, 1 mm, 5 mm, or even at least 10 mm). In sonic embodiments, the discrete crystalline regions have an avenge crystal size not greater than 200 nanometers. In some embodiments, each of the first and second discrete crystalline regions each have an average crystal size not greater than 200 nanometers.

In some embodiments, for example, the composition of the first and second discrete crystalline regions are the same, while in others they are different.

In some embodiments, the metal oxide other than $Al_2O_3$ for at least one of the first or second discrete crystalline regions is $ZrO_2$, wherein in some preferred embodiments, at least one of the first or second discrete crystalline regions comprises $Al_2O_3$ in a range of about 55 to about 65 percent by weight to a range of about 45 to about 35 percent by weight $ZrO_2$, based on the total $Al_2O_3$ and $ZrO_2$ content of the first or second discrete crystalline regions, as applicable.

In some embodiments at least one of the first or second discrete crystalline regions further comprises (e.g., greater than 0 to 50 percent by weight, based on the total weight of the first and second discrete crystalline regions, as applicable) additional metal oxide(s) (e.g., $Y_2O_3$, REO, $ZrO_2$, $TiO_2$, CaO, $Cr_2O_3$, MgO, NiO, CuO, and complex metal oxides thereof). In some embodiments, at least one of the first and second discrete crystalline regions comprises $Al_2O_3$, $Y_2O_3$, and $ZrO_2$. In some embodiments, at least one of the first and second discrete crystalline regions comprises $Al_2O_3$, REO, and $ZrO_2$.

In some embodiments, the composite material is in the form of a layer. In some embodiments, a composite layer comprises an amorphous layer and a layer of the composite material. Compositions of the amorphous layer include those disclosed in the instant application.

In some embodiments, at least 50, 60, 70, 75, 80, 90, or even at least 95 percent by volume of the glass-ceramic is crystalline.

Another exemplary embodiment is a ceramic comprising 35 (in some embodiments, preferably at least 40, 45, 50, 55, 60, 65, or even at least 70) percent by weight $Al_2O_3$, based on the total weight of the ceramic, a first metal oxide other than $Al_2O_3$ (e.g., $Y_2O_3$, REO, $ZrO_2$, $TiO_2$, CaO, $Cr_2O_3$, MgO, NiO, CuO, and complex metal oxides thereof), and a second, different metal oxide other than $Al_2O$, wherein the $Al_2O_3$ (e.g., $Y_2O_3$, REO, $ZrO_2$, $TiO_2$, CaO, $Cr_2O_3$, MgO, NiO, CuO, and complex metal oxides thereof), the first metal oxide, and second metal oxide collectively comprise at least 80 (in some embodiments, preferably, at least 85, 90, 95, 97, 98, 99, or even 100) percent by weight of the ceramic, and wherein the particles contain not more than 10 (in some embodiments, preferably not more than 5, 4, 3, 2, 1, or zero) percent by weight collectively $As_2O_3$, $B_2O_3$, $GeO_2$, $P_2O_5$, $SiO_2$, $TeO_2$, and $V_2O_5$, based on the total weight of the ceramic, the ceramic having first and second crystalline comprising regions having first and second degrees of crystallinity, respectively, wherein the degree of crystallinity of the first region is greater than the degree of crystallinity of the second region, with the proviso that if the first or second metal oxide other than $Al_2O_3$ of the first or second regions is $ZrO_2$, then the ceramic further comprise a metal oxide other than $Al_2O_3$ and $ZrO_2$ that at least a portion of which is present as a distinct crystalline phase. In some embodiments, the first region has x, y, and z dimensions each perpendicular to each other, and wherein each of the x, y, and z dimensions is at least 150 micrometers (in some embodiments, preferably, at least 200 micrometers, 250 micrometers, 500 micrometers, 1000 micrometers, 2000 micrometers, 2500 micrometers, 1 mm, 5 mm, or even at least 10 mm). in some embodiments, for example, the composition of the first and second discrete crystalline regions are the same, while in others they are different.

In some embodiments, the metal oxide other than $Al_2O_3$ for at least one of the first and second discrete crystalline regions is $ZrO_2$, wherein in some preferred embodiments, at least one of the first and second discrete crystalline regions comprises $Al_2O_3$ in a range of about 55 to about 65 percent by weight to a range of about 45 to about 35 percent by weight $ZrO_2$, based on the total $Al_2O_3$ and $ZrO_2$ content of the first and second discrete crystalline regions, as applicable.

In some embodiments at least one of the first and second discrete crystalline regions further comprises (e.g., greater than 0 to 50 percent by weight, based on the total weight of the at least one of the first and second discrete crystalline regions, as applicable) additional metal oxide(s) (e.g., $Y_2O_3$, REO, $ZrO_2$, $TiO_2$, CaO, $Cr_2O_3$, MgO, NiO, CuO, and complex metal oxides thereof). In some embodiments, at least one of the first and second discrete crystalline regions comprises $Al_2O_3$, $Y_2O_3$, and $ZrO_2$. In some embodiments, at least one of the first and second discrete crystalline regions comprises $Al_2O_3$, REO, and $ZrO_2$.

In some embodiments, the composite material is in the form of a layer. In some embodiments, a composite layer comprises an amorphous layer and a layer of the composite material. Compositions of the amorphous layer include those disclosed in the instant application.

In some embodiments, at least 50, 60, 70, 75, 80, 90, or even at least 95 percent by volume of the glass-ceramic is crystalline.

Such exemplary materials can be made by embodiments of methods according to the present invention, although it is also within the scope of making such materials to substitute the specified compositions or other material requirements (including in some cases and minimum x, y, z, dimensions). In one method, for example, the feed particles may comprise a mixture of particles having, for example, different composition. In some embodiments, one component of the mixture may form an amorphous matrix while another component forms discrete crystalline regions. Different components making up the feed particles may have different chemical, different phases, different physical states (e.g., porosity, size, and/or shape), or combinations thereof. In some embodiments the particles making up the feed may have been formed via flame forming or plasma spraying into amorphous and/or crystalline particles. In some embodiments, the relative proportions of different components making up the fed may be varied continuously to provide a material having gradient features (e.g., a compositional gradient and/or various degrees of crystallinity). In some embodiments a gradient may comprise a compositional gradient of two or more different compositions varying, for example, chemically. In some embodiments, the relative proportions of different components making up the feed particles may be varied in a step wise manner to form a layered composite. Each layer, for example, may have different compositions, degrees of crystallinity (including different phases), combinations thereof. In same embodiments, amorphous material is heat-treated to convert at least a portion thereof to glass-ceramic.

Abrasive particles made by methods according to the present invention generally comprise crystalline ceramic (in some embodiments, preferably at least 75, 80, 85, 90, 91, 92, 93, 94, 95, 96, 97, 98, 99, 99.5, or even 100 percent by volume) crystalline ceramic.

The abrasive particles can be incorporated into an abrasive article, or used in loose form. The abrasive articles comprise binder and a plurality of abrasive particles, wherein at least a portion of the abrasive particles are the abrasive particles made by a method according to the present invention. Exemplary abrasive products include coated abrasive articles, bonded abrasive articles (e.g., wheels), nonwoven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, preferably, at least 5, 10, 15, 20, 25, 30, 35, 40, 45, 50 55, 60, 65, 70, 75, 80, 85, 90, 95, or even 100 percent by weight of the abrasive particles in an abrasive article are the abrasive particles made by a method according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles made by a method according to the present invention. In some embodiments, preferably, at least 5, 10, 15, 20, 25, 30, 35, 40, 45, 50 55, 60, 65, 70, 75, 80, 85, 90, 95, or even 100 percent by weight of the plurality of abrasive particles are the abrasive particles made by a method according to the present invention, based on the total weight of the plurality of abrasive particles.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Preferred ANSI grades comprising abrasive particles according to the present invention are ANSI 8–220. FEPA grade designations include P8, P12, P16, P24, P36, P40, P50, P60, P80, P100, P120, P150, P180, P220, P320, P400, P500, P600, P800, P1000, and P1200. Preferred FEPA grades comprising abrasive particles according to the present invention are P12P220. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS 10,000. Preferred JIS grades comprising abrasive particles according to the present invention are JIS8–220.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form amorphous material. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating amorphous (e.g., glass) comprising particles such that at least a portion of the amorphous material converts to glass-ceramic to provide abrasive particles comprising the glass-ceramic. The present invention also provides a method for making abrasive particles comprising a glass-ceramic, the method comprising heat-treating amorphous material such that at least a portion of the amorphous material converts to glass-ceramic, and crushing the resulting heat-treated material to provide the abrasive particles. When crushed, glass tends to provide sharper particles than crushing significantly crystallized glass-ceramics or crystalline material.

In another aspect, the present invention provides agglomerate abrasive grains each comprise a plurality of abrasive particles made by a method according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) made by a method according to the present invention. Methods of making such abrasive articles and using abrasive articles using abrasive particles are well known to those skilled in the art. Furthermore, abrasive particles made by a method according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

Figure 1:
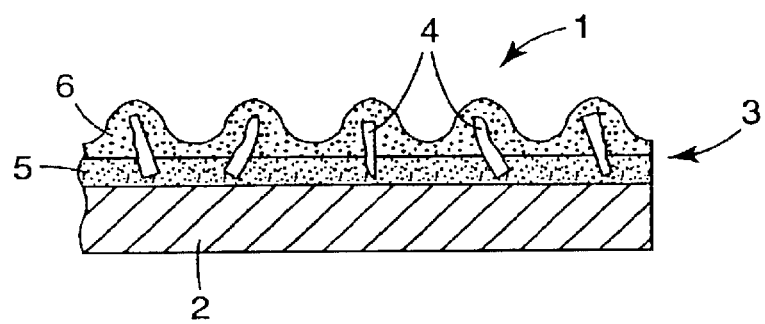
FIG. 1 is a fragmentary cross-sectional schematic view of a coated abrasive article including abrasive particles made according to a method of the present invention.

An example of a coated abrasive article is depicted in FIG. 1. Referring to this figure, coated abrasive article according to the present invention 1 has a backing (substrate) 2 and abrasive layer 3. Abrasive layer 3 includes abrasive particles made by a method according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
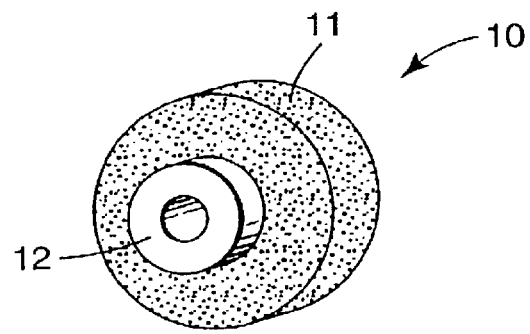
FIG. 2 is a perspective view of a bonded abrasive article including abrasive particles made according to a method of the present invention.

A preferred form is a grinding wheel. Referring to FIG. 2, grinding wheel 10 is depicted, which includes abrasive particles made by a method according to the present invention 11, molded in a wheel and mounted on hub 12.

Figure 3:
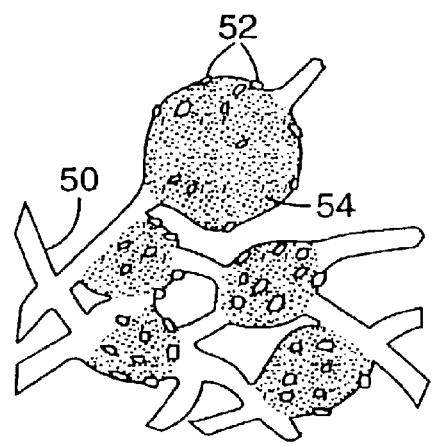
FIG. 3 is an enlarged schematic view of a nonwoven abrasive article including abrasive particles made according to a method of the present invention.

Nonwoven abrasive articles typically include an open porous lofty polymer filament structure having abrasive particles made by a method according to the present invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive article is provided. Such a nonwoven abrasive article according to the present invention comprises fibrous mat 50 as a substrate, onto which abrasive particles made by a method according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles may be in the shape of a wheel (including cut off wheels), honing stone, mounted pointed or other conventional bonded abrasive shape. A preferred vitrified bonded abrasive article is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

Preferred vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 g/m² (desirably, about 80–160 g/m²). In vitrified bonded abrasive articles grinding aid is typically impregnated into the pores of the article.

The abrasive articles can contain 100% abrasive particles made by a method according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles made by a method according to the present invention. In some instances, the abrasive particles made by a method according to the present invention may be blended with another abrasive particles and/or diluent particles at a ratio between 5 to 75% by weight, about 25 to 75% by weight about 40 to 60% by weight, or about 50% to 50% by weight (i.e. in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol-gel abrasive particles include those described U.S. Pat. Nos. 4,314,327 (Leitheiser et al.), 4,518,397 (Leitheiser et al.), 4,623,364 (Cottringer et al.), 4,744,802 (Schwabel), 4,770,671 (Monroe et at.), 4,881,951 (Wood et al.), 5,011,508 (Wald et al.), 5,090,968 (Pellow), 5,139,978 (Wood), 5,201,916 (Berg et al.), 5,227,104 (Bauer), 5,366,523 (Rowenhorst et al.), 5,429,647 (Larmie), 5,498,269 (Larmie), and 5,551,963 (Larmie), the disclosures of which are incorporated herein by reference. Additional details concerning sintered alumina abrasive particles made by using alumina powders as a raw material source can also be found, for example, in U.S. Pat. Nos. 5,259,147 (Falz), 5,593,467 (Monroe), and 5,665,127 (Moltgen), the disclosures of which are incorporated herein by reference. Additional details concerning fused abrasive particles, can be found, for example, in U.S. Pat. Nos. 1,161,620 (Coulter), 1,192,709 (Tone), 1,247,337 (Saunders et al)4, 1,268,533 (Allen), and 2,424,645 (Baumann et al.) 3,891,408 (Rowse et al.), 3,781,172 (Pett et al.), 3,893,826 (Quinan et al.), 4,126,429 (Watson), 4,457,767 (Poon et al.), 5,023,212 (Dubots et. al), 5,143,522 (Gibson et al.). and 5,336,280 (Dubots et. al), and applications having U.S. Ser. Nos. 09/495,978, 09/496,422, 09/496,638, and 09/496,713, each filed on Feb. 2, 2000, and, 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles made by a method according to the present invention, with the smaller sized particles being another abrasive particle type. Conversely, for example, the smaller sized abrasive particles may be abrasive particles made by a method according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles made by a method according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles made by a method according to the present invention, and the second (outermost) layer comprises abrasive particles made by a method according to the present invention. Likewise in a bonded abrasive, there may be two distinct sections of the grinding wheel. The outermost section may comprise abrasive particles made by a method according to the present invention, whereas the innermost section does not. Alternatively, abrasive particles made by a method according to the present invention may be uniformly distributed throughout the bonded abrasive article.

Further details regarding coated abrasive articles can be round, for example, in U.S. Pat. No. 4,734,104 (Broberg), U.S. Pat. No. 4,737,163 (Larkey), U.S. Pat. No. 5,203,884 (Buchanan et at.), U.S. Pat. No. 5,152,917 (Pieper et al.), U.S. Pat. No. 5,378,251 (Culler et al.), U.S. Pat. No. 5,417,726 (Stout et al), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et at.), U.S. Pat. No. 5,961,674 (Gagliardi et al.), and U.S. Pat. No. 5,975,988 (Christianson), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et at.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al), the disclosure of which is incorporated herein by reference.

The present invention provides a method of abrading a surface, the method comprising contacting at least one abrasive particle made by a method according to the present invention, with a surface of a workpiece; and moving at least of one the abrasive particle or the contacted surface to abrade at least a portion of said surface with the abrasive particle. Methods for abrading with abrasive particles made by a method according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles made by a method according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made by a method according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Embodiments of particulate amorphous and glass-ceramics made according to a method of the present invention may be useful, for example, as fillers in polymeric, metallic, or ceramic matrix composites, as raw materials for forming ceramic materials. Transparent forms may be used as retro-reflective beads. Embodiments of particulate amorphous and glass-ceramics made according to a method of the present invention may be viscoelastically deformed into simple or complex shaped bulk materials.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, all examples contain no significant amount of $SiO_2$, $B_2O_3$, $P_2O_5$, $GeO_2$, $TeO_2$, $As_2O_3$, and $V_2O_5$.

EXAMPLES

Example 1

A 250-ml polyethylene bottle (7.3-cm diameter) was charged with the following 50-gram mixture: 19.3 grams of alumina particles (obtained from Alcoa Industrial Chemicals, Bauxite, AR, under the trade designation "A16SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.), 75 grams of isopropyl alcohol, and 200 grams of alumina milling media (cylindrical in shape, both height and diameter of 0.635 cm; 99.9% alumina; obtained from Coors, Golden, Colo.). The contents of the polyethylene bottle were milled for 16 hours at 60 revolutions per minute (rpm). The ratio of alumina to zirconia in the starting material was 2:1, and the alumina and zirconia collectively made up about 58 weight percent (wt-%). After the milling, the milling media were removed and the slurry was poured onto a warm (approximately 75° C.) glass ("PYREX") pan and dried. The dried mixture was screened through a 70-mesh screen (212-micrometer opening size) with the aid of a paint brush.

After grinding and screening, the mixture of milled feed particles was fed slowly (0.5 gram/minute) into a hydrogen/oxygen torch flame to melt the particles. The torch used to melt the particles, thereby generating molten droplets, was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The dried and sized particles were fed slowly (0.5 gram/minute) into the torch flame, which melted the particles and carried them on to an inclined stainless steel surface (approximately 51 centimeters (20 inches) wide with a slope angle of 45 degrees) with cold water running over (approximately 8 liters/minute) the surface to rapidly quench the molten droplets. The resulting molten and quenched beads were collected and dried at 110° C. The particles were spherical in shape and varied in size from a few micrometers (i.e., microns) up to 250 micrometers.

Subsequently, the flame-formed beads having diameters less than 125 micrometers were then passed through a plasma gun and deposited on stainless steel substrates as follows.

Four 304 stainless steel substrates (76.2 millimeter (mm)× 25.4 mm×3.175 mm dimensions), and two 1080 carbon steel substrates (76.2 mm×25.4 mm×1.15 mm) were prepared in the following manner. The sides to be coated were sandblasted, washed in an ultrasonic bath, and then wiped clean with isopropyl alcohol. Four stainless steel and one 1080 carbon steel substrates were placed approximately 10 centimeters (cm) in front of the nozzle of a plasma gun (obtained under the trade designation "Praxair SG-100 Plasma Gun" from Praxair Surface Technologies, Concord, N.H.). The second 1080 carbon steel was placed 18 cm in front of the nozzle of the plasma gun. The coatings made on the second 1080 carbon steel samples at a distance of 18 cm in front of the nozzle of the plasma gun were not further characterized.

The plasma unit (described above with reference to FIG. 4) had a power rating of 40 kW. The plasma gas was argon (50 pounds per square inch (psi), 0.3 megapascal (MPa)) with helium as the auxiliary gas (150 psi, 1 MPa). The beads were passed through the plasma gun by using argon as the carrier gas (50 psi, 0.3 MPa) using a Praxair Model 1270 computerized powder feeder (obtained from Praxair Surface Technologies, Concord, N.H.). During deposition, a potential of about 40 volts and a current of about 900 amperes was applied and the plasma gun was panned left to right, up and down, to evenly coat the substrates. When the desired thickness was achieved, the plasma spray was shut off and the samples were recovered. The 1080 carbon steel substrate was flexed, thus separating the coating from the substrate resulting in a free-standing bulk material. The deposited material had a z dimension (thickness) of about 1350 micrometers, as determined using optical microscopy.

The phase composition (glassy/amorphous/crystalline) was determined through Differential Thermal Analysis (DTA) as described below. The material was classified as amorphous if the corresponding DTA trace of the material contained an exothermic crystallization event ($T_x$). If the same trace also contained an endothermic event ($T_g$) at a temperature lower than $T_x$ it was considered to consist of a glass phase. If the DTA trace of the material contained no such events, it was considered to contain crystalline phases.

Differential thermal analysis (DTA) was conducted using the following method. DTA runs were made (using an instrument obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). The amount of each screened sample placed in a 100-microliter $Al_2O_3$ sample holder was about 400 milligrams. Each sample was heated in static air at a rate of 10° C./minute from room temperature (about 25° C.) to 1100° C.

The coated material (on 304 stainless steel substrates) exhibited an endothermic event at a temperature around 880° C., as evidenced by a downward change in the curve of the trace. It is believed this event was due to the glass transition ($T_g$) of the glass material. The same material exhibited an exothermic event at a temperature around 931° C., as evidenced by a sharp peak in the trace. It is believed that this event was due to the crystallization ($T_x$) of the material. Thus, the coated material (on 304 stainless steel substrates) and the free-standing bulk material were glassy as determined by a DTA trace.

A portion of the glassy free-standing bulk material was then heat-treated at 1300° C. for 48 hours. Powder X-ray diffraction, XRD, (using an X-ray diffractometer (obtained under the trade designation "PHILLIPS XRG 3100" from Phillips, Mahwah, N.J.) with copper K αT radiation of 1.54050 Angstrom) was used to determine the phases present. The phases were determined by comparing the peaks present in the XRD trace of the crystallized material to XRD patterns of crystalline phases provided in JCPDS databases, published by International Center for Diffraction Data. The resulting crystalline material included $LaAlO_3$, $ZrO_2$ (cubic, tetragonal), $LaAl_{11}O_{18}$, and transitional $Al_2O_3$ phases.

Figure 5:
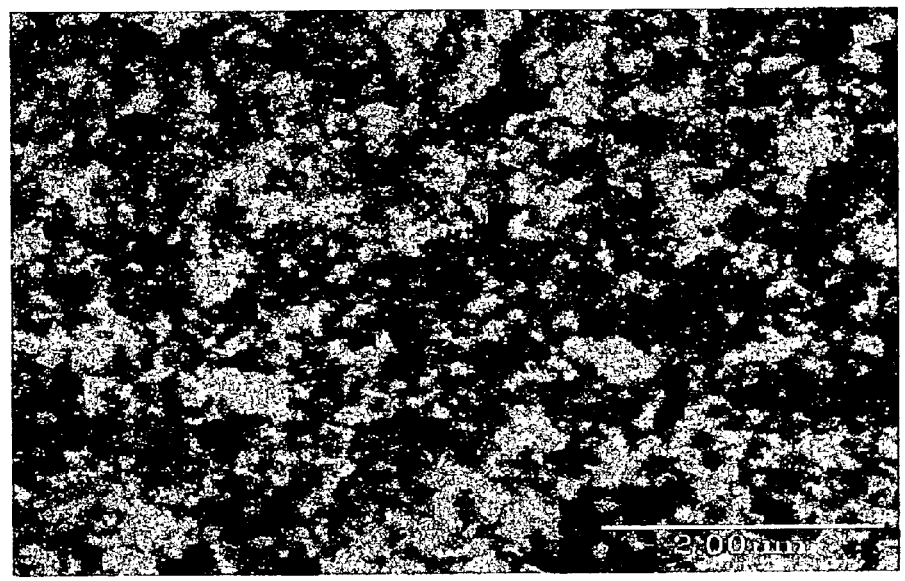
FIG. 5 Scanning Electron Micrograph (SEM) of fractured surface of material prepared in Example 1.

Another portion of the glassy free-standing bulk material was crystallized at 1300° C. for 1 hour in an electrically heated furnace (obtained from CM Furnaces, Bloomfield, N.J. under the trade designation "Rapid Temp Furnace"). The crystallized coating was crushed with a hammer into particles of −30+35 mesh size (i.e., the fraction collected between 600-micrometer opening size and 500-micrometer opening size screens). The particles were cleaned of debris by washing in a sonic bath (obtained from Cole-Parmer, Vernon Hills, Ill., under the trade designation "8891") for 15 minutes, dried at 100° C., and several were mounted on a metal cylinder (3 cm in diameter and 2 cm high) using carbon tape. The mounted sample was sputter coated with a thin layer of gold-palladium and viewed using a JEOL scanning electron microscopy (SEM) (Model JSM 840A). The fractured surface was rough and no crystals coarser than 200 nanometers (nm) were observed (see FIG. 5) in the SEM.

Example 2

Feed particles were made as described in Example 1 using the following 50-gram mixture: 21.5 grams of alumina particles (obtained from Alcoa Industrial Chemicals, Bauxite, AR under the trade designation "A16SG"), 9 grams of zirconium oxide particles (obtained from Zirconia Sales, Inc. of Marietta, Ga. under the trade designation "DK-2"), and 19.5 grams of cerium oxide particles (obtained from Rhone-Poulence, France). The ratio of alumina to zirconia in the starting material was 2.4:1 and the alumina and zirconia collectively made up about 61 weight percent. Feed particles were flame-formed into beads (of a size that varied from a few micrometers up to 250 micrometers) as described in Example 1. Subsequently, the flame-formed beads having diameters between 180 micrometers and 250 micrometers were sprayed through a plasma gun and deposited on stainless and carbon steel substrates as described in Example 1.

The 1080 carbon steel substrates were flexed, thus separating the coating from the substrate resulting in a free-standing bulk material. The resulting bulk material had a z dimension (thickness) of about 700 micrometers, as determined using optical microscopy. The microstructure was also observed using optical microscopy. The material consisted of generally spherical and oblique crystalline particles, which were opaque, within a predominantly amorphous matrix, which was transparent. Amorphous material is typically transparent due to the lack of light scattering centers such as crystal boundaries, while the crystalline particles show a crystalline structure and are opaque due to light scattering effects. The crystalline phases, determined by powder XRD analysis as described in Example 1, consisted of $Zr_{0.4}Ce_{0.6}O_2$ (cubic) and transitional $Al_2O_3$.

A second deposition experiment was carried out using the flame-formed beads having diameters less than 125 micrometers. The resulting coating had a z dimension (thickness) of about 1100 micrometers, as determined using optical microscopy. The microstructure was also observed using optical microscopy. This material had similar features (i.e., consisted of generally spherical and oblique crystalline particles within a predominantly amorphous matrix) to those of the material formed from beads having diameters between 180 micrometers and 250 micrometers. The crystalline phases, determined by XRD analysis as described in Example 1, consisted of $Zr_{0.4}Ce_{0.6}O_2$ (cubic) and transitional $Al_2O_3$.

The average hardness of the as-sprayed material of this example was determined as follows. Sections of the material were mounted in mounting resin (obtained under the trade designation "TRANSOPTIC POWDER" from Buehler, Lake Bluff, Ill.). The resulting cylinder of resin was about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The microhardness measurements were made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements were made according to the guidelines stated in ASTM Test Method E384 Test Methods for Microhardness of Materials (1991), the disclosure of which is incorporated herein by reference. The average microhardness (an average of 20 measurements) of the material of this example was 15 gigapascals (Gpa).

Example 3

Feed particles were made as described in Example 1 using the following 50-gram mixture: 27.9 grams of alumina particles (obtained from Alcoa Industrial Chemicals, Bauxite, AR under the trade designation "A16SG"), 7.8 grams of zirconium oxide particles (obtained from Zirconia Sales, Inc. of Marietta, Ga. under the trade designation "DK-2"), and 14.3 grams of yttrium oxide particles (obtained from H. C. Stark Newton, Mass.). The ratio of alumina to zirconia of initial starting materials was 3.5:1 and the alumina and zirconia collectively made up about 72 weight percent. The feed particles were then screened through a 30-mesh screen (600-micrometer opening size) and heat-treated at 1400° C. for 2 hours in an electrically heated furnace (obtained from CM Furnaces, Bloomfield, N.J. under the trade designation "Rapid Temp Furnace"). The heat-treated particles were further screened to separate out particles with diameters between 125 micrometers and 180 micrometers, which were then passed through a plasma gun and deposited on stainless steel substrates as described in Example 1.

The 1080 carbon steel substrate was flexed, thus separating the coating from the substrate resulting in a free-standing bulk material. The resulting bulk material had a z dimension (thickness) of about 700 micrometers, as determined using optical microscopy. The microstructure was observed using optical microscopy. This material consisted of generally crystalline opaque particles (which retained their original angular shapes) within a predominantly transparent, amorphous matrix. The crystalline phases, determined by powder XRD analysis as described in Example 1, consisted of $Al_5Y_3O_{12}$ and $Y_{0.15}Zr_{0.85}O_{193}$.

Figure 6:
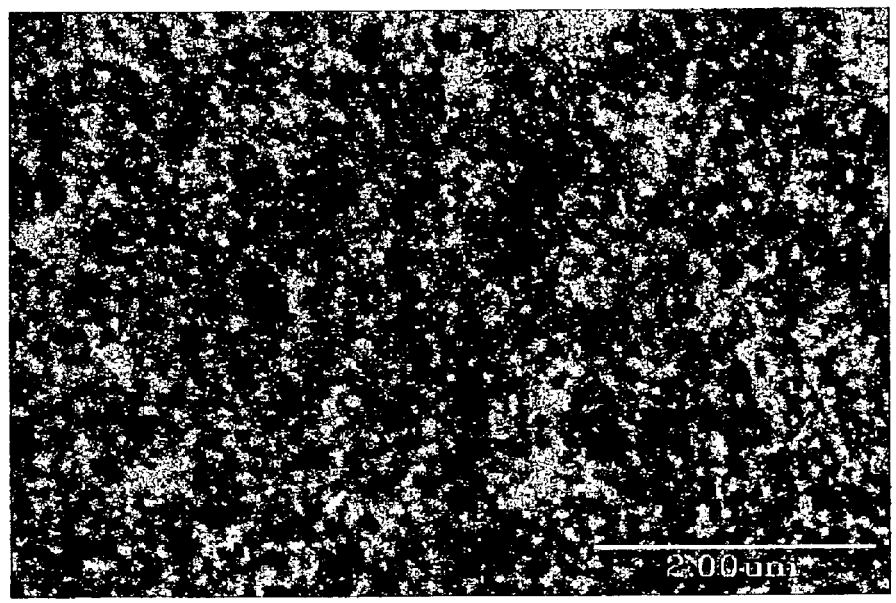
FIG. 6 Scanning Electron Micrograph (SEM) of fractured surface of material prepared in Example 3.

Another portion of the free-standing bulk material was crystallized at 1300° C. for 1 hour and the fractured surface was sputter coated with a thin layer of gold-palladium and viewed using a JEOL SEM (Model JSM 840A), as described above in Example 1. The fractured surface was rough and no crystals coarser than 200 nm were observed (see FIG. 6).

A second deposition experiment was carried out using heat-treated particles having diameters less than 125 micrometers. The resulting coating was about 1500 micrometers thick (z dimension). The microstructure was observed using optical microscopy. This material had similar features (consisted of generally opaque, crystalline particles (which retained their original angular shapes) within a predominantly transparent, amorphous matrix) to the material formed from beads having diameters between 180 micrometers and 250 micrometers. The crystalline phases, determined by XRD analysis as described in Example 1, consisted of $Al_5Y_3O_{12}$ and $Y_{0.15}Zr_{0.85}O_{193}$.

Example 4

A thick coating consisting of various layers of the above three examples was plasma sprayed using feed particles produced in Examples 1–3. The first layer was coated as described in Example 2, the second as described in Example 1, and the third as described in Example 3.

The substrate was not sandblasted prior to coating so that it was removed easily by plying it apart by hand, resulting in a free-standing bulk material, approximately 75 millimeters (mm)×25 mm×7.5 mm. A cross-section, cutting through each layer, was sectioned from the material using a diamond saw. The sectioned piece was mounted in mounting resin (obtained under the trade designation "TRANSOPTIC POWDER" from Buehler, Lake Bluff, Ill.) such that the different layers were visible. The resulting cylinder of resin was about 2.5 cm in diameter and about 1.9 cm tall (i.e., high). The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries.

The first layer had a z dimension (thickness) of approximately 2.5 mm, as determined using optical microscopy. The microstructure was observed using optical microscopy. This material had similar features to those of the material of Example 2 (i.e., consisted of generally spherical and opaque crystalline particles within a predominantly transparent, amorphous matrix). The second layer had a z dimension (thickness) of approximately 2 mm, as determined using optical microscopy. The microstructure was also observed using optical microscopy. This material had similar features to those of the material of Example 1 (i.e., was transparent suggesting it was amorphous). The third layer had a z dimension (thickness) of approximately 3 mm, as determined using optical microscopy. The microstructure was also observed using optical microscopy. This material had similar features to those of the material of Example 3 (i.e., it consisted of generally opaque crystalline particles (which mostly retained their original angular shapes) within a predominantly transparent, amorphous matrix).

Comparative Example A

Feed particles of Yttria-stabilized Zirconia, average size 125 micrometers, (obtained under the trade designation "ZIRSPRAY 9204" from Praxair Surface Technologies, Concord, N.H.) were passed through a plasma gun and deposited on stainless and carbon steel substrates as described in Example 1.

The abrasion wear was measured (in grams) for Examples 1–3 and Comparative Example A according to ASTM standard G65-00c1 "Standard Test Method for Measuring Abrasion Using the Dry Sand/Rubber Wheel Apparatus". The results, Table 1 below, show the abrasion resistance of the coating prepared according to the invention to be greater than three times that of Comparative Example A.

TABLE 1

| Example | Mass loss, grams |
|---|---|
| Ex. 1 | 1.3 |
| Ex. 2 | 1.5 |
| Ex. 3 | 1.2 |
| Comp A | 5.1 |

Example 5

Feed particles were made as described in Example 1 using the following 50-gram mixture: 19.3 grams of alumina particles (obtained from Alcoa Industrial Chemicals, Bauxite, AR under the trade designation "A16SG"), 9.5 grams of zirconium oxide particles (obtained from Zirconia Sales, Inc. of Marietta, Ga. under the trade designation "DK-2"), and 21.2 grams of lanthanum oxide particles (obtained from Molycorp Inc., Mountain Pass, Calif.). The feed particles were then screened through a 30-mesh screen (600-micrometer opening size screen) and heat-treated at 1400° C. for 2 hours in an electrically heated furnace (obtained from C M Furnaces, Bloomfield, N.J. under the trade designation "Rapid Temp Furnace").

The heat-treated particles were further screened to separate out particles with diameters smaller than 100 micrometers, which were then sprayed through a plasma gun (obtained under the trade designation "Praxair SG-100 Plasma Gun" from Praxair Surface Technologies, Concord, N.H.), and into a cylindrical port attached perpendicularly to a cylindrical steel container covered on top with baffles, to collect plasma-sprayed particles. The feed particles were fed (using a Praxair Model 1270 computerized powder feeder obtained from Praxair Surface Technologies, Concord, N.H.) into the plasma through an orifice in the anode of the plasma gun. The feed orifice was tilted approximately 30 degrees towards the back of the plasma gun to increase the residence time of the particles in the plasma.

Nitrogen gas was used as the carrier gas to transport the feed into the plasma. The plasma gases of argon, helium (auxiliary gas), and nitrogen (auxiliary and carrier gas) formed a highly energetic "tri-gas" plasma to uniformly melt the particles. The following conditions were used: Gun current of 1150 Amperes, Potential of 52 Volts, Arc gas (argon at 0.28 MPa (40 psi)), Auxiliary gas (helium at 0.28 MPa (40 psi)), Auxiliary gas (nitrogen at 0.28 MPa (40 psi)), Carrier gas (100 volume percent nitrogen at 0.28 MPa (40 psi)).

Optical microscopy observation of the resulting plasma-sprayed particles showed a mixture of spherical, elongated, and splat-like shapes, which were predominantly transparent or amorphous. Amorphous material is typically transparent due to the lack of light scattering centers such as crystal boundaries, while the crystalline particles are opaque due to light scattering effects of the crystal boundaries.

The plasma-sprayed particles were crystallized at 1300° C. for 1 hour in an electrically heated furnace (obtained from CM Furnaces, Bloomfield, N.J. under the trade designation "Rapid Temp Furnace"). The crystalline phases were determined by powder XRD analysis as described in Example 1. The resulting crystalline material included $LaAlO_3$, $ZrO_2$ (cubic, tetragonal), $LaAl_{11}O_{18}$, and transitional $Al_2O_3$ phases.

Example 6

Plasma-sprayed particles were made according to Example 5, except the "Praxair SG-100 Plasma Gun" was modified using a Miller Thermal 2089 A extension nozzle (obtained from Praxair Surface Technologies, Concord, N.H.). This configuration allowed the plasma-sprayed particles to be directed into a water bath for collection.

Optical microscopy observation of the resulting plasma-processed particles showed a mixture of shapes, which were predominantly transparent/amorphous.

The plasma-sprayed particles were crystallized at 1300° C. for 1 hour in an electrically heated furnace (obtained from C M Furnaces, Bloomfield, N.J. under the trade designation "Rapid Temp Furnace"). The crystalline phases were determined by powder XRD analysis as described in Example 1. The resulting crystalline material included $LaAlO_3$, $ZrO_2$ (cubic, tetragonal), $LaAl_{11}O_{18}$, and transitional $Al_2O_3$ phases.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A composite material comprising discrete crystalline regions within an amorphous matrix, wherein the crystalline regions and the amorphous matrix each independently comprise at least 35 percent by weight $Al_2O_3$, based on the total weight of the crystalline regions and the amorphous matrix, respectively, and a metal oxide other than $Al_2O_3$, wherein the crystalline regions and the amorphous matrix each contain not more than 10 percent by weight collectively $As_2O_3$, $B_2O_3$, $GeO_2$, $P_2O_5$, $SiO_2$, $TeO_2$, and $V_2O_5$, based on the total weight of the crystalline regions and the amorphous matrix, respectively, and wherein the composite material has x, y, and z dimensions each perpendicular to each other, and wherein each of the x, y, and z dimensions is at least 150 micrometers.

2. The composite material according to claim 1 wherein the amorphous matrix does not have a $T_g$.

3. The composite material according to claim 1 wherein the amorphous matrix is glass.

4. A layer of the composite material according to claim 1.

5. A composite layer comprising an amorphous layer and a layer of the composite material according to claim 1.

6. The composite material according to claim 1 comprising a first portion and a second portion, wherein the first portion has an average number of the discrete crystalline regions per $mm^3$, wherein the second portion has an average number of the discrete crystalline regions per $mm^3$, and wherein the average number of the discrete crystalline regions per $mm^3$ of the first portion is greater than the average number of the discrete crystalline regions per $mm_3$ of the second portion.

7. The composite material according to claim 6 comprising a third portion disposed between the first and second portions, wherein the third portion has an average number of the discrete crystalline regions per $mm^3$ and wherein the average number of the discrete crystalline regions per $mm^3$ of the third portion is greater than the average number of the discrete crystalline regions per $mm^3$ of the second portion, and less than the average number of the discrete crystalline regions per $mm^3$ of the first portion.

8. The composite material according to claim 6 wherein the average number of the discrete crystalline regions per $mm^3$ for the first portion is at least 50 percent larger than the average number of the discrete crystalline regions per $mm^3$ for the second portion.

9. A layer of the composite material according to claim 6.

10. Composite ceramic comprising discrete crystalline regions in a glass-ceramic matrix, wherein the discrete crystalline region and the glass-ceramic matrix independently comprise at least 35 percent by weight $Al_2O_3$, based on the total weight of the crystalline regions and the glass-ceramic matrix, respectively, and a metal oxide other than $Al_2O_3$, wherein the discrete crystalline regions and the glass-ceramic matrix each contain not more than 10 percent by weight collectively $As_2O_3$, $B_2O_3$, $GeO_2$, $P_2O_5$, $SiO_2$, $TeO_2$, and $V_2 O_3$, based on the total weight of the discrete crystalline regions and the glass-ceramic matrix, respectively, and wherein the composite ceramic has x, y, and z dimensions each perpendicular to each other, and wherein each of the x, y, and z dimension is at least 150 micrometer.

11. The composite material according to claim 10 wherein the discrete crystalline regions have an average crystal size not greater than 200 nanometers.

12. The composite material according to claim 10 wherein at least 50 percent by volume of the glass-ceramic is crystalline.

13. A layer of the composite material according to claim 10.

14. A composite layer comprising an amorphous layer and a layer of the composite material according to claim 10.

15. A glass-ceramic layer having first and second opposite surfaces, a first ceramic compositional region comprising at least 35 percent by weight $Al_2O_3$, based on the total weight of the first ceramic compositional region, and a metal oxide other than $Al_2O_3$, wherein first ceramic compositional region contains not more than 10 percent by weight collectively $As_2O_3$, $B_2O_3$, $GeO_2$, $P_2O_5$, $SiO_2$, $TeO_2$, and $V_2O_3$, based on the total weight or the first ceramic compositional region, and a second ceramic compositional region comprising at least 35 percent by weight $Al_2O_3$, based on the total weight of the second ceramic compositional region, and a metal oxide other than $Al_2O_3$, wherein the second ceramic compositional region contain not more than 10 percent by weight collectively $As_2O_3$, $B_2O_3$, $GeO_2$, $P_2O_3$, $SiO_2$, $TeO_2$, and $V_{2O3}$, based on the total weight of the second ceramic compositional region, wherein the first ceramic compositional region is closer to the first surface than it is to the second surface, and wherein the second ceramic compositional region is closer to the second surface than it is to the first surface, and wherein the first compositional region has x, y, and z dimensions each perpendicular to each other, and wherein each of the x, y, and z dimensions is at least 150 micrometers.

16. The glass-ceramic layer according to claim 15 wherein the first ceramic compositional region is amorphous, and wherein the second ceramic compositional region is at least partially crystalline.

17. The glass-ceramic layer according to claim 15 wherein each of the first and second ceramic compositional regions are at least partially crystalline.

18. A composite layer comprising layer and the composite layer according to claim 15.

19. A ceramic comprising at least 15 percent by weight $Al_2O_3$, based on the total weight of the ceramic, and a metal oxide than $Al_2O_3$, wherein ceramic contains not more than 10 percent by weight collectively $As_2O_3$, $B_2$, $O_3GeO_2$, $P_2O_5$, $SiO_2$, $TeO_2$, and $V_2O_3$, based on the total weight of the ceramic, the ceramic having firm and second crystalline comprising regions having first and second degrees of crystallinity, respectively, wherein the degree of crystallinity of the first region is greater than the degree of crystallinity of the second region, and wherein the first region has x, y, and z dimensions each perpendicular to each other, and wherein each of the x, y, and z dimension is at least 150 micrometers.

20. The ceramic according to claim 19 wherein the first discrete crystalline regions have an average crystal size not greater than 200 nanometers.

21. The ceramic according to claim 19 wherein each of the first and second discrete crystalline region each have an average crystal size not greater than 200 nanometers.

22. The ceramic according to claim 19 wherein at least 50 percent by volume of the ceramic is crystalline.

23. A layer of the ceramic according to claim 22.

24. A composite material comprising discrete crystalline regions within an amorphous matrix, wherein the crystalline regions and the amorphous matrix each independently comprise at least 35 percent by weight $Al_2O_3$, based on the total weight of the discrete crystalline regions and the amorphous matrix, a first metal oxide other than $Al_2O_3$, and a second, different metal oxide other than $Al_2O_3$, wherein the $Al_2O_3$, first metal oxide, and second metal oxide collectively comprise at least 80 percent by weight of the discrete crystalline regions and the amorphous matrix, and wherein the discrete crystalline regions and the amorphous matrix contain not more than 10 percent by weight collectively $As_2O_3$, $B_2O_3$, $GeO_2$, $P_2O_5$, $SiO_2$, $TeO_2$, and $V_2$, $O_5$, based on the total weight of the discrete crystalline regions and the amorphous matrix, with the proviso that if the first or second metal oxide other than $Al_2O_3$ of the discrete crystalline regions is $ZrO_2$, then the discrete crystalline regions further comprise a metal oxide other than $Al_2O_3$ and $ZrO_2$ that at least a portion of which is present as a distinct crystalline phase, and with the proviso that if the first or second metal oxide other than $Al_2O_3$ of the amorphous matrix is $ZrO_2$, then the amorphous matrix further comprises a metal oxide other than $Al_2O_3$ and $ZrO_2$ that at least a portion of which forms a distinct crystalline phase when the amorphous matrix is crystallized.

25. The composite material according to claim 24 wherein the amorphous matrix does not have a $T_g$.

26. The composite material according to claim 24 wherein the amorphous matrix is glass.

27. A layer of the composite material according to claim 24.

28. A composite layer comprising an amorphous layer and a layer of the composite material according to claim 24.

29. The composite material according to claim 24 comprising a first portion and a second portion, wherein the first portion has an average number of the discrete crystalline regions per $mm^3$, wherein the second portion has an average number of the discrete crystalline regions per $mm^3$, and wherein the average number of the discrete crystalline regions per $mm^3$ of the first portion is greater than the average number of the discrete crystalline regions per $mm^3$ of the second portion.

30. The composite material according to claim 29 comprising a third portion disposed between the first and second portions, wherein the third portion has an average number of the discrete crystalline regions per $mm^3$, and wherein the average number of the discrete crystalline regions per $mm^3$ or the third portion is greater than the average number of the discrete crystalline regions per $mm^3$ of the second portion, and less than the average number of the discrete crystalline regions per $mm^3$ of the first portion.

31. The composite material according to claim 29 wherein the average number of the discrete crystalline regions per $mm^3$ for the first portion is at least 50 percent larger than the average number of the discrete crystalline regions per $mm^3$ for the second portion.

32. A layer of the composite material according to claim 29.

33. Composite ceramic comprising discrete crystalline regions in a glass-ceramic matrix, wherein the discrete crystalline regions and the glass-ceramic matrix independently comprise at least 35 percent by weight $Al_2O_3$, based on the total weight of the particles, a first metal oxide other than $Al_2O_3$, and a second, different metal oxide other than $Al_2O$, wherein the $Al_2O_3$, first metal oxide, and second metal oxide collectively comprise at least 80 percent by weight of the discrete crystalline regions and the glass-ceramic matrix, and wherein the discrete crystalline regions and the glass-ceramic matrix contain not more than 10 percent by weight collectively $As_2O_3$, $B_2O_3$, $GeO_2$, $P_2O_5$, $SiO_2$, $TeO_2$, and $V_2O_5$, based on the total weight of the discrete crystalline regions and the glass-ceramic matrix, with the proviso with the proviso that if the first or second metal oxide other than $Al_2O_3$ of the discrete crystalline regions is $ZrO_2$ then the discrete crystalline regions further comprise a metal oxide other than $Al_2O_3$ and $ZrO_2$ that at least a portion of which is present as a distinct crystalline phase, and with the proviso that if the first or second metal oxide other than $Al_2O_3$ of the glass-ceramic matrix is $ZrO_2$, then the glass-ceramic matrix further comprises a metal oxide other than $Al_2O_3$ and $ZrO_2$ that at least a portion of which is present as a distinct crystalline phase.

34. The composite material according to claim 33 wherein the discrete crystalline regions have an average crystal size not greater than 200 nanometers.

35. The composite material according to claim 33 wherein at least 50 percent by volume of the glass-ceramic is crystalline.

36. A layer of the composite material according to claim 33.

37. A composite layer comprising an amorphous layer and a layer of the composite material according to claim 33.

38. A gloss-ceramic layer having first and second opposite surfaces, a first ceramic compositional region and a second compositional region each independently comprise at least 35 percent by weight $Al_2O_3$, based on the total weight of the first or second compositional region, respectively, a first metal oxide other than $Al_2O_3$, and a second, different metal oxide other than $Al_2O_3$, wherein the $Al_2O_3$, first metal oxide, and second metal oxide collectively comprise at least 80 percent by weight of the first or second compositional region, respectively, and wherein the first or second compositional region, respectively, contain not more than 10 percent by weight collectively $As_2O_3$, $B_2O_3$, $GeO_2$, $P_2O_5$, $SiO_2$, $TeO_2$, and $V_2O_3$, based on the total weight of the first or second compositional region, respectively, with the proviso that if the first or second metal oxide other than $Al_2O_3$ of the first or second compositional region, respectively, is $ZrO_2$ then the first or second compositional region, respectively, further comprises a metal oxide other than $Al_2O_3$ and $ZrO_2$ that at least a portion of which is present as a distinct crystalline phase.

39. The glass-ceramic layer according to claim 38 wherein the first ceramic compositional region is amorphous, and wherein the second ceramic compositional region is at least partially crystalline.

40. The glass-ceramic layer according to claim 38 wherein each of the first and second ceramic compositional regions are at least partially crystalline.

41. A composite layer comprising an amorphous layer and the composite layer according to claim 38.

42. A ceramic comprising 35 percent by weight $Al_2O_3$, based on the total weight of the particles, a first metal oxide other than $Al_2O_3$, and a second, different metal oxide other than $Al_2O$, wherein the $Al_2O_3$, first metal oxide, and second metal oxide collectively comprise at least 80 percent by weight of the ceramic, and wherein the particles contain not more than 10 percent by weight collectively $As_2O_3$, $B_2O_3$, $GeO_2$, $P_2O_5$, $SiO_2$, $TeO_2$, and $V_2O_5$, based on the total weight of the ceramic, the ceramic having first and second crystalline comprising regions having first and second degrees of crystallinity, respectively, wherein the degree of crystallinity of the first region is greater than the degree of crystallinity of the second region, with the proviso that if the first or second metal oxide other than $Al_2O_3$ of the discrete crystalline regions is $ZrO_2$, then the ceramic further comprise a metal oxide other than $Al_2O_3$ and $ZrO_2$ that at least a portion of which is present as a distinct crystalline phase.

43. The ceramic according to claim 42 wherein the first discrete crystalline regions have an average crystal size not greater than 200 nanometers.

44. The ceramic according to claim 42 wherein each of the first and second discrete crystalline regions each have an average crystal size not greater than 200 nanometers.

45. The ceramic according to claim 42 wherein at least 50 percent by volume of the ceramic is crystalline.

46. A layer of the ceramic according to claim 42.

* * * * *

UNITED STATES PATENT AND TRADEMARK OFFICE
CERTIFICATE OF CORRECTION

PATENT NO. : 7,179,526 B2
APPLICATION NO. : 10/211640
DATED : February 20, 2007
INVENTOR(S) : Anatoly Z. Rosenflanz et al.

It is certified that error appears in the above-identified patent and that said Letters Patent is hereby corrected as shown below:

Title Page
Item [56] References Cited, OTHER PUBLICATIONS, on Page 4, Col. 1, Line 54, delete "Dodlrums" and insert -- Doldrums -- therefor.
Item [56] References Cited, OTHER PUBLICATIONS, on Page 4, Col. 2, Line 55, delete "Metals" and insert -- Metal -- therefor.
Item [56] References Cited, OTHER PUBLICATIONS, on Page 5, Col. 1, Line 40, delete "Figs," and insert -- Figs. -- therefor.
Item [56] References Cited, OTHER PUBLICATIONS, on Page 5, Col. 1, Line 59, delete "Figs," and insert -- Figs. -- therefor.
Item [56] References Cited, OTHER PUBLICATIONS, on Page 5, Col. 2, Line 21, delete "$Al_2O_3$ $Y_2O_3$" and insert -- $Al_2O_3$-$Y_2O_3$ -- therefor.
Item [56] References Cited, OTHER PUBLICATIONS, on Page 6, Col. 1, Line 33, delete "Gandi" and insert -- Gandhi -- therefor.
Item [56] References Cited, OTHER PUBLICATIONS, on Page 6, Col. 1, Line 37, delete "$\gamma$-$Al_2$ $O_3$" and insert -- $\gamma$-$Al_2O_3$ -- therefor.
Item [56] References Cited, OTHER PUBLICATIONS, on Page 6, Col. 1, Line 52, delete "Tranmission" and insert -- Transmission -- therefor.
Item [56] References Cited, OTHER PUBLICATIONS, on Page 6, Col. 1, Line 52, delete "($R_2$or" and insert -- ($R_2$O -- therefor.
Item [56] References Cited, OTHER PUBLICATIONS, on Page 6, Col. 1, Line 59, delete "Cerm." and insert -- Ceram. -- therefor.
Item [56] References Cited, OTHER PUBLICATIONS, on Page 6, Col. 2, Line 4, delete "Ceramic" and insert -- Ceramics -- therefor.
Item [56] References Cited, OTHER PUBLICATIONS, on Page 6, Col. 2, Line 6, delete "Amercian" and insert -- American -- therefor.
Item [56] References Cited, OTHER PUBLICATIONS, on Page 6, Col. 2, Line 10, delete "Fundamentsal" and insert -- Fundamental -- therefor.
Item [56] References Cited, OTHER PUBLICATIONS, on Page 6, Col. 2, Line 16, delete "Non-Crst." and insert -- Non-Cryst. -- therefor.
Item [56] References Cited, OTHER PUBLICATIONS, on Page 6, Col. 2, Line 40, delete "USPUB" and insert -- USPGPUB -- therefor.
Item [56] References Cited, OTHER PUBLICATIONS, on Page 6, Col. 2, Line 45, after "$Al_2O_3$," insert -- $Y_2O_3$, -- therefor.
Item [56] References Cited, OTHER PUBLICATIONS, on Page 6, Col. 2, Line 46, after "$HfO_2$," delete "$Nb_2O_2$," and insert -- $Nb_2O_5$ -- therefor.
Item [56] References Cited, OTHER PUBLICATIONS, on Page 6, Col. 2, Line 51, delete "PGPUB" and insert -- USPGPUB -- therefor.

UNITED STATES PATENT AND TRADEMARK OFFICE
CERTIFICATE OF CORRECTION

| | |
|---|---|
| PATENT NO. | : 7,179,526 B2 |
| APPLICATION NO. | : 10/211640 |
| DATED | : February 20, 2007 |
| INVENTOR(S) | : Anatoly Z. Rosenflanz et al. |

It is certified that error appears in the above-identified patent and that said Letters Patent is hereby corrected as shown below:

Title Page
Item [56] References Cited, under U.S. Patent Documents, please add the following reference that was considered by the examiner but does not appear on the printed patent:

-- 5,395,407 B1  8/26/1997     Cottringer et al. --

Under OTHER PUBLICATIONS, please add the following references that were considered by the examiner but do not appear on the printed patent:

-- Aasland and McMillan, Nature 369, 633 (1994)
  Aguilar et al. "Melt Extraction Processing of Structural $Y_2O_3$-$Al_2O_3$ Fibers", J. Eur. Ceram. Soc. 20 1091-1098 (2000) --

Column 2
Line 32, after "micrometers" delete "." and insert -- , -- therefor.
Line 36, delete "," after "$Al_2O_3$".
Line 37, delete "," after "$Al_2O_3$".
Line 43, after "length of" insert -- a --.

Column 6
Line 46, delete "particle," and insert -- particles, -- therefor.

Column 7
Line 27, delete "load" and insert -- lead -- therefor.

Column 11
Line 25, delete "Are" and insert -- Arc -- therefor.

Column 12
Line 25, delete "micrometers." and insert -- micrometers, -- therefor.
Line 34, delete "at leant" and insert -- at least -- therefor.
Line 43, delete "dimension" and insert -- dimensions -- therefor.
Line 47, after "150 micrometers" insert -- , --.
Line 49, delete "micrometers." and insert -- micrometers, -- therefor.

Column 14
Line 47, delete "aver" and insert -- over -- therefor.
Line 63, delete "be can" and insert -- can be -- therefor.

UNITED STATES PATENT AND TRADEMARK OFFICE
CERTIFICATE OF CORRECTION

PATENT NO. : 7,179,526 B2
APPLICATION NO. : 10/211640
DATED : February 20, 2007
INVENTOR(S) : Anatoly Z. Rosenflanz et al.

It is certified that error appears in the above-identified patent and that said Letters Patent is hereby corrected as shown below:

Column 17
Line 4, delete "collected," and insert -- collected -- therefor.

Column 20
Line 15, delete "$Al_2O_3$metal" and insert -- $Al_2O_3$ metal -- therefor.

Column 21
Line 33, delete "$ZrO_2$" and insert -- $ZrO_2$, and -- therefor.

Column 23
Line 23, after "18 Gpa" insert -- , --.
Line 26, delete "embodiments." and insert -- embodiments, -- therefor.
Line 34, after "10/211,684" insert -- filed the same day as the instant application --.

Column 24
Line 16, delete "$A_2O_3$" and insert -- $Al_2O_3$ -- therefor.
Line 16, delete "REQ." and insert -- REO, -- therefor.
Line 39, delete "nut" and insert -- not -- therefor.

Column 25
Line 36, delete "$Al_{203}$," and insert -- $Al_2O_3$, -- therefor.
Line 44, delete "$GeO_2P_2O_5$," and insert -- $GeO_2$, $P_2O_5$, -- therefor.
Line 44, delete "base" and insert -- based -- therefor.
Line 45, delete "cystalline" and insert -- crystalline -- therefor.
Line 46, delete the second occurrence of "with the proviso".
Line 49, delete "$A_2O_3$" and insert -- $Al_2O_3$ -- therefor.
Line 62, delete "same" and insert -- some -- therefor.

Column 27
Line 61, delete "$A_2O_3$" and insert -- $Al_2O_3$ -- therefor.
Line 64, delete "$A_2O_3$" and insert -- $Al_2O_3$ -- therefor.

Column 28
Line 27, delete "$Cr_3O_2$," and insert -- $Cr_2O_3$, -- therefor.
Line 32, delete "REQ," and insert -- REO, -- therefor.

UNITED STATES PATENT AND TRADEMARK OFFICE
CERTIFICATE OF CORRECTION

PATENT NO.         : 7,179,526 B2
APPLICATION NO. : 10/211640
DATED                 : February 20, 2007
INVENTOR(S)       : Anatoly Z. Rosenflanz et al.

It is certified that error appears in the above-identified patent and that said Letters Patent is hereby corrected as shown below:

Column 29
Line 29, delete "thereof)," and insert -- thereof). -- therefor.
Line 49, delete "NiO)," and insert -- NiO, -- therefor.

Column 30
Line 59, delete "sonic" and insert -- some -- therefor.
Line 61, delete "avenge" and insert -- average -- therefor.

Column 31
Line 60, after "10 mm)." delete "in" and insert -- In -- therefor.

Column 32
Line 52, delete "same" and insert -- some -- therefor.

Column 33
Line 45, delete "P12P220." and insert -- P12-P220. -- therefor.

Column 36
Line 51, delete "tetrachloronaphtalene," and insert -- tetrachloronaphthalene, -- therefor.

Column 37
Line 32, delete "4,314,327" and insert -- 4,314,827 -- therefor.
Line 34, after "(Monroe" delete "et at.)" and insert -- et al.) -- therefor.
Line 47, delete "(Saunders et al)4" and insert -- (Saunders et al.) -- therefor.

Column 38
Line 45, delete "round," and insert -- found, -- therefor.
Line 47, after "(Buchanan" delete "et at.)" and insert -- et al.) -- therefor.
Line 58, after "(Haynes" delete "et at.)" and insert -- et al.) -- therefor.

Column 41
Line 44, delete "K α T" and insert -- K α 1 -- therefor.

Column 44
Line 46, delete "G65-00c1" and insert -- G65-00e1 -- therefor.

UNITED STATES PATENT AND TRADEMARK OFFICE
CERTIFICATE OF CORRECTION

PATENT NO. : 7,179,526 B2
APPLICATION NO. : 10/211640
DATED : February 20, 2007
INVENTOR(S) : Anatoly Z. Rosenflanz et al.

It is certified that error appears in the above-identified patent and that said Letters Patent is hereby corrected as shown below:

Column 46
Line 33, In Claim 6, delete "$mm_3$" and insert -- $mm^3$ -- therefor.
Line 38, In Claim 7, delete "$mm_3$" and insert -- $mm^3$ -- therefor.
Line 52, In Claim 10, delete "region" and insert -- regions -- therefor.
Line 59, In Claim 10, delete "$V_2 O_3$," and insert -- $V_2 O_5$, -- therefor.
Line 63, In Claim 10, delete "dimension" and insert -- dimensions -- therefor.
Line 64, in Claim 10, delete "micrometer." and insert -- micrometers. -- therefor.

Column 47
Line 14, In Claim 15, delete "$V_2O_3$," and insert -- $V_2O_5$, -- therefor.
Line 15, In Claim 15, after "eight" delete "or" and insert -- of -- therefor.
Line 20, In Claim 15, delete "contain" and insert -- contains -- therefor.
Line 21, In Claim 15, delete "$P_2O_3$," and insert -- $P_2O_5$, -- therefor.
Line 22, In Claim 15, delete "$V_{2O3}$," and insert -- $V_2O_5$, -- therefor.
Line 38, In Claim 18, after "comprising" insert -- an amorphous -- therefor.
Line 40, In Claim 19, delete "15" and insert -- 35 -- therefor.
Line 42, In Claim 19, after "oxide" insert -- other --.
Line 43, In Claim 19, delete "$B_2, O_3$" and insert -- $B_2O_3$, -- therefor.
Line 44, In Claim 19, delete "$V_2O_3$," and insert -- $V_2O_5$, -- therefor.
Line 45, In Claim 19, delete "firm" and insert -- first -- therefor.
Line 51, In Claim 19, delete "dimension" and insert -- dimensions -- therefor.
Line 57, In Claim 21, delete "region" and insert -- regions -- therefor.

Column 48
Line 7, In Claim 24, delete "$V_2, O_5$," and insert -- $V_2O_5$, -- therefor.
Line 41, In Claim 30, delete "or" and insert -- of -- therefor.
Lines 65-66, In Claim 33, delete the second occurrence of "with the proviso".
Line 67, In Claim 33, delete "$ZrO_2$" and insert -- $ZrO_2$ -- therefor.

Column 49
Line 19, In Claim 38, delete "gloss-ceramic" and insert -- glass-ceramic -- therefor.
Line 31, In Claim 38, delete "$V_2O_3$," and insert -- $V_2O_5$, -- therefor.

UNITED STATES PATENT AND TRADEMARK OFFICE
CERTIFICATE OF CORRECTION

PATENT NO. : 7,179,526 B2
APPLICATION NO. : 10/211640
DATED : February 20, 2007
INVENTOR(S) : Anatoly Z. Rosenflanz et al.

It is certified that error appears in the above-identified patent and that said Letters Patent is hereby corrected as shown below:

Column 50
Lines 17-18, In Claim 42, delete "$B_2,O_3GeO_2$," and insert -- $B_2O_3$, $GeO_2$, -- therefor.

Signed and Sealed this

Sixth Day of May, 2008

JON W. DUDAS
*Director of the United States Patent and Trademark Office*